United States Patent
Sutardja

(10) Patent No.: US 8,299,763 B2
(45) Date of Patent: *Oct. 30, 2012

(54) DIGITAL LOW DROPOUT REGULATOR

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 107 days.

This patent is subject to a terminal disclaimer.

(21) Appl. No.: 12/838,679

(22) Filed: Jul. 19, 2010

(65) Prior Publication Data

US 2010/0277141 A1 Nov. 4, 2010

Related U.S. Application Data

(63) Continuation of application No. 10/754,187, filed on Jan. 8, 2004, now Pat. No. 7,872,454, which is a continuation-in-part of application No. 10/693,787, filed on Oct. 24, 2003, now Pat. No. 7,760,525.

(60) Provisional application No. 60/496,957, filed on Aug. 21, 2003.

(51) Int. Cl.
 *G05F 1/656* (2006.01)

(52) U.S. Cl. ........................................ 323/222; 363/17

(58) Field of Classification Search .......... 323/282–288, 323/268, 272, 280, 205, 222; 327/274–277, 327/465, 555; 330/133, 285, 296, 297; 363/16–20, 363/21.05
See application file for complete search history.

(56) References Cited

U.S. PATENT DOCUMENTS

| | | | |
|---|---|---|---|
| 3,529,233 A | 9/1970 | Podell | |
| 3,579,214 A | 5/1971 | Solyst | |
| 3,851,375 A | 12/1974 | Koomeef | |
| 4,020,439 A | 4/1977 | Thiessens et al. | |
| 4,040,174 A | 8/1977 | Tsuda | |
| 4,203,081 A | 5/1980 | Braeckelmann | |
| 4,214,198 A | 7/1980 | Schneider | |
| 4,245,286 A | 1/1981 | Paulkovich et al. | |
| 4,273,051 A | 6/1981 | Stratton | |
| 4,384,321 A | 5/1983 | Rippel et al. | |

(Continued)

FOREIGN PATENT DOCUMENTS

DE 3622190 A 1/1988

(Continued)

OTHER PUBLICATIONS

"Understanding Ferrite Bead Inductors", http://www.murata.com, pp. 23-25 (unknown date of publication).

(Continued)

*Primary Examiner* — Rajnikant Patel

(57) ABSTRACT

A circuit includes a regulator. The regulator includes first and second inductors and first and second arrays of switches. An output of the second inductor is connected to an output of the first inductor. The first array of switches is configured to receive an input voltage and is connected to an input of and in series with the first inductor. The second array of switches is configured to receive the input voltage and is connected to an input of and in series with the second inductor. An output voltage of the regulator is provided at the outputs of the first and second inductors. A controller is configured to detect and regulate the output voltage by generating control signals based on the output voltage. States of switches in the first and second arrays of switches are controlled by respective ones of the control signals.

21 Claims, 19 Drawing Sheets

U.S. PATENT DOCUMENTS

| | | | |
|---|---|---|---|
| 4,408,268 A * | 10/1983 | Peters et al. | 363/62 |
| 4,475,143 A | 10/1984 | Hernandez | |
| 4,527,032 A | 7/1985 | Young et al. | |
| 4,536,733 A | 8/1985 | Shelly et al. | |
| 4,578,664 A | 3/1986 | Kinzler et al. | |
| 4,583,068 A | 4/1986 | Dickens et al. | |
| 4,616,142 A | 10/1986 | Upadhyay et al. | |
| 4,675,629 A | 6/1987 | Sakamoto et al. | |
| 4,801,912 A | 1/1989 | McElheny et al. | |
| 4,803,609 A | 2/1989 | Gillett et al. | |
| 4,897,773 A | 1/1990 | Bilczo | |
| 5,006,782 A | 4/1991 | Pelly | |
| 5,079,498 A | 1/1992 | Cleasby et al. | |
| 5,186,647 A | 2/1993 | Denkmann et al. | |
| 5,204,809 A | 4/1993 | Andresen | |
| 5,303,115 A | 4/1994 | Nayar et al. | |
| 5,363,035 A | 11/1994 | Hutchison et al. | |
| 5,402,329 A | 3/1995 | Wittenbreder | |
| 5,442,317 A | 8/1995 | Stengel | |
| 5,444,600 A | 8/1995 | Dobkin et al. | |
| 5,475,296 A | 12/1995 | Vinsant et al. | |
| 5,481,238 A | 1/1996 | Carsten et al. | |
| 5,500,629 A | 3/1996 | Meyer | |
| 5,509,691 A | 4/1996 | Kaule et al. | |
| 5,636,107 A | 6/1997 | Lu et al. | |
| 5,654,881 A | 8/1997 | Albrecht et al. | |
| 5,802,709 A | 9/1998 | Hogge et al. | |
| 5,808,537 A | 9/1998 | Kondo et al. | |
| 5,821,832 A | 10/1998 | Moreau | |
| 5,875,103 A * | 2/1999 | Bhagwat et al. | 363/17 |
| 5,889,373 A | 3/1999 | Fisher et al. | |
| 5,959,441 A * | 9/1999 | Brown | 323/282 |
| 5,999,417 A | 12/1999 | Schlecht | |
| 6,023,154 A | 2/2000 | Martinez | |
| 6,043,634 A | 3/2000 | Nguyen | |
| 6,049,264 A | 4/2000 | Sailer et al. | |
| 6,054,764 A | 4/2000 | Howser et al. | |
| 6,057,665 A | 5/2000 | Herniter et al. | |
| 6,084,790 A | 7/2000 | Wong | |
| 6,137,389 A | 10/2000 | Uchikoba | |
| 6,144,269 A | 11/2000 | Okamoto et al. | |
| 6,150,798 A | 11/2000 | Ferry | |
| 6,166,527 A | 12/2000 | Dwelley et al. | |
| 6,184,666 B1 | 2/2001 | Boeckmann et al. | |
| 6,191,673 B1 | 2/2001 | Ogura et al. | |
| 6,229,289 B1 | 5/2001 | Piovaccari et al. | |
| 6,246,592 B1 | 6/2001 | Balogh et al. | |
| 6,255,804 B1 | 7/2001 | Herniter et al. | |
| 6,259,235 B1 | 7/2001 | Fraidlin et al. | |
| 6,282,103 B1 | 8/2001 | Naito et al. | |
| 6,310,534 B1 | 10/2001 | Brunner | |
| 6,329,801 B1 | 12/2001 | Zuniga et al. | |
| 6,348,744 B1 | 2/2002 | Levesque | |
| 6,356,179 B1 | 3/2002 | Yamada | |
| 6,356,462 B1 | 3/2002 | Jang et al. | |
| 6,362,986 B1 | 3/2002 | Schultz | |
| RE37,738 E | 6/2002 | Brkovic | |
| 6,404,175 B1 | 6/2002 | Yang et al. | |
| 6,459,349 B1 | 10/2002 | Giday et al. | |
| 6,462,962 B1 * | 10/2002 | Cuk | 363/16 |
| 6,483,623 B1 | 11/2002 | Maruyama | |
| 6,493,242 B1 | 12/2002 | Riggio et al. | |
| 6,512,352 B2 | 1/2003 | Qian | |
| 6,512,437 B2 | 1/2003 | Jin et al. | |
| 6,683,522 B2 | 1/2004 | Walsh | |
| 6,686,823 B2 | 2/2004 | Arntz et al. | |
| 6,696,823 B2 | 2/2004 | Ledenev et al. | |
| 6,703,815 B2 | 3/2004 | Biagi | |
| 6,738,274 B2 | 5/2004 | Prasad et al. | |
| 6,784,644 B2 | 8/2004 | Xu et al. | |
| 6,798,177 B1 | 9/2004 | Liu et al. | |
| 6,820,321 B2 | 11/2004 | Harding | |
| 6,822,427 B2 | 11/2004 | Wittenbreder | |
| 6,853,169 B2 * | 2/2005 | Burstein et al. | 323/272 |
| 6,853,568 B2 | 2/2005 | Li et al. | |
| 6,853,588 B2 | 2/2005 | Kim et al. | |
| 6,967,553 B2 | 11/2005 | Jitaru | |
| 6,995,685 B2 | 2/2006 | Randall | |
| 7,679,347 B2 * | 3/2010 | He et al. | 323/282 |
| 2001/0052837 A1 | 12/2001 | Walsh | |
| 2002/0039061 A1 | 4/2002 | Timashov | |
| 2003/0111985 A1 | 6/2003 | Xi | |
| 2003/0227366 A1 | 12/2003 | Lin | |
| 2006/0116623 A1 | 6/2006 | Han et al. | |

FOREIGN PATENT DOCUMENTS

| | | |
|---|---|---|
| DE | 19837639 | 3/2000 |
| EP | 0484074 A | 5/1992 |
| EP | 0503715 | 9/1992 |
| EP | 0 632 571 A | 1/1996 |
| EP | 0895257 A | 2/1999 |
| EP | 0929143 | 7/1999 |
| EP | 1239574 A2 | 9/2002 |
| GB | 2318691 A | 4/1998 |
| JP | 57193007 | 11/1982 |
| JP | 58224420 A | 12/1983 |
| JP | 61078111 A | 4/1986 |
| JP | 02125404 A | 5/1990 |
| JP | 02251107 | 10/1990 |
| JP | 06260869 | 9/1994 |
| JP | 11008123 | 1/1999 |
| JP | 11074125 A | 3/1999 |
| JP | 11146638 A | 5/1999 |
| JP | 11204354 A | 7/1999 |
| JP | 20020570039 A | 2/2002 |
| JP | 2002-095166 | 3/2002 |
| JP | 2003332141 A | 11/2003 |
| JP | 2005-252783 | 9/2005 |
| JP | 2008-274582 | 11/2008 |
| WO | WO00/74089 A1 | 12/2000 |
| WO | WO 01/43276 | 6/2001 |
| WO | WO 02/17469 | 2/2002 |
| WO | WO02/095775 A1 | 11/2002 |

OTHER PUBLICATIONS

"Using Ferrite Beads to Keep RF Out of TV Sets, Telephones, VCR's, Burglar Alarms and Other Electronic Equipment," http://www.antennex.com, pp. 1-4 (unknown date of publication).

Power Converter Topologies, How to Choose the Right One for Your Design; Dennis L. Feucht; Innovatia Laboratories; 2002; 4 pages.

U.S. Appl. No. 10/621,128, filed Jul. 16, 2003, entitled, "Power Inductor With Reduced DC Current Saturation", pp. 1-33, and 6 sheets of drawings.

U.S. Appl. No. 10/693,787, filed Oct. 24, 2003, entitled, "Voltage Regulator", pp. 1-104, and 11 sheets of drawings.

U.S. Appl. No. 10/744,416, filed Dec. 22, 2003, entitled, "Power Inductor With Reduced DC Current Saturation", pp. 1-39, and 9 sheets of drawings.

U.S. Appl. No. 10/754,187, filed Jan. 8, 2004, entitled, "Digital Low Dropout Regulator", pp. 1-85, and 19 sheets of drawings.

Hayt and Kemmerly, "Engineering Circuit Analysis", 1986, Mcgraw-Hill Book Company, Fourth Edition, pp. 442-443.

Sanchis-Kilders E. et al; "New very low power, high efficiency, DC/DC power supply for LEO satellite constellation"; Power Electronics Specialists Conferences, 1999; pp. 1146-1151.

Wei, Chen et al; "Dual-loop feedback for fast low dropout regulators"; 32nd Annual IEEE Power Electronics Specialists Conference; 2001; pp. 1265-1269.

Communication and partial European Search Report from the European Patent Office dated Oct. 6, 2006 for Application No. 04019981.2-1242.

Communication and partial European Search Report from the European Patent Office dated Oct. 6, 2006 for Application No. 04019963.0-1242.

Communication from European Patent Office dated Aug. 6, 2007 for Application No. 07 004 458.1-1242; 5 pages.

Communication from European Patent Office dated Oct. 6, 2006 with the European Search Report for Application No. 04019978.8-1242; 3 pages.

* cited by examiner

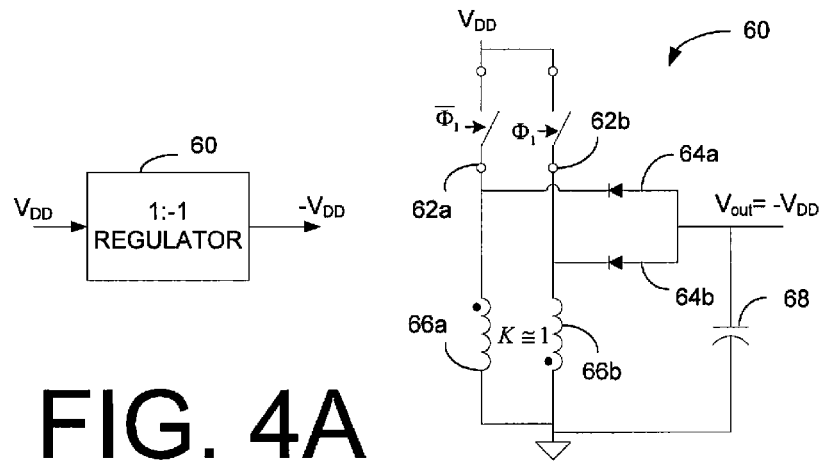
FIG. 4A
FIG. 4B
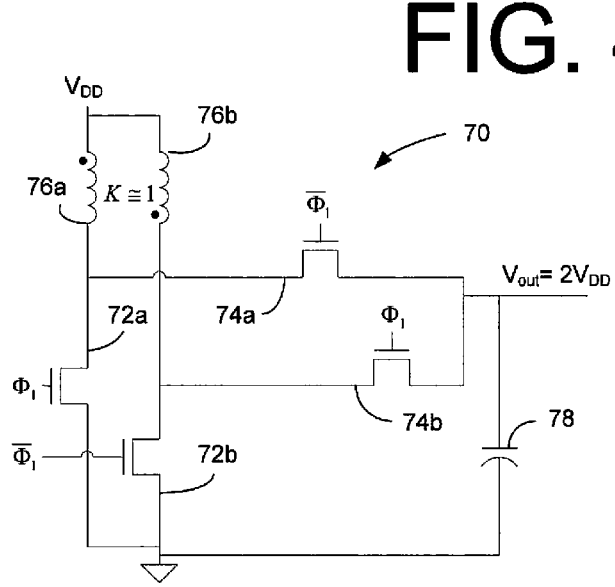
FIG. 5

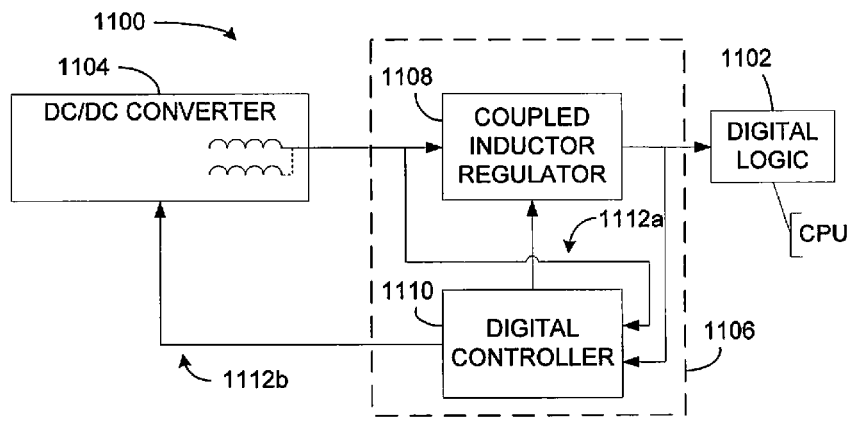
FIG. 19A
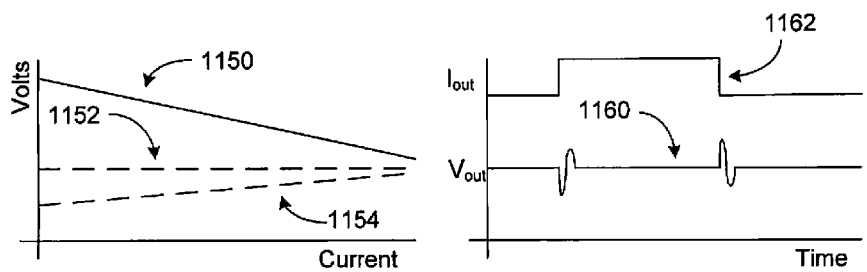
FIG. 20A    FIG. 20B
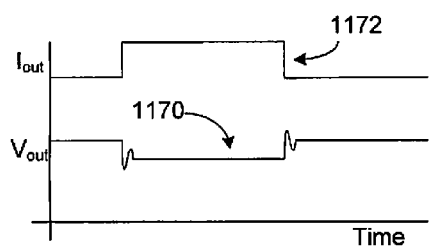 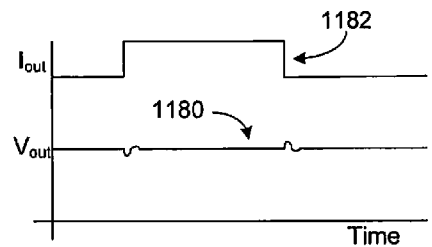
FIG. 20C    FIG. 20D

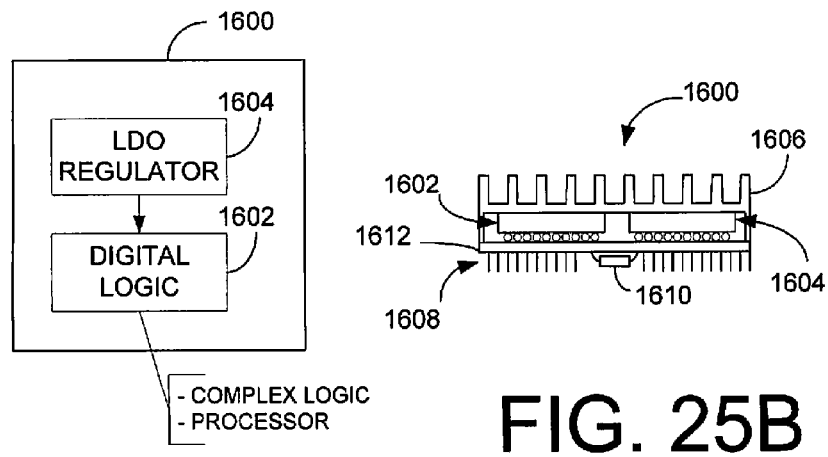
FIG. 25A
FIG. 25B
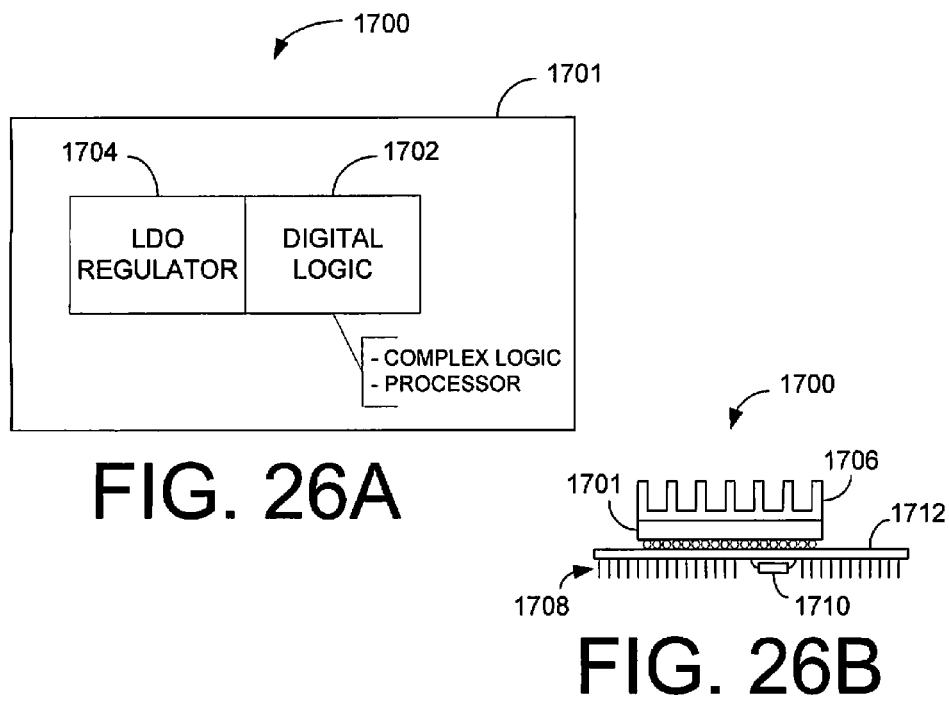
FIG. 26A
FIG. 26B

DIGITAL LOW DROPOUT REGULATOR

CROSS-REFERENCE TO RELATED APPLICATIONS

This application is a continuation of U.S. patent application Ser. No. 10/754,187, filed Jan. 8, 2004, which is continuation-in-part of U.S. patent application Ser. No. 10/693,787, filed Oct. 24, 2003, which claims the benefit of U.S. provisional application No. 60/496,957, filed Aug. 21, 2003, the entire contents of which are herein incorporated by reference.

TECHNICAL FIELD

An aspect of this invention relates to power systems for electronic circuits.

BACKGROUND

Low dropout voltage regulators are widely used to provide voltage regulation in electronics sub-systems. An LDO may be most effectively used when the difference voltage between the input supply voltage and the regulated output voltage is very small. The smaller the difference voltage is, the higher the power efficiency of the LDO. For example, the efficiency of a 2.5 volt LDO operating from a 3.3 volt supply is about 75%. Although, the efficiency of an LDO is relatively poor in comparison to a conventional high performance DC/DC converter, it may be offset by the relatively low cost of the LDO. However, as the difference voltage across the LDO increases, the efficiency of the LDO may become prohibitively low. For example, when generating a 1.2 volt regulated supply voltage from a 3.3 volt supply the efficiency of an LDO decreases to a very poor 36%. Unfortunately, present day digital integrated circuits operate with a supply voltage of approximately 1.2 volts or less, while the lowest output voltage from a typical DC/DC converter is approximately 3.3 volts, leading to excessive losses in conventional LDO regulators.

SUMMARY

A low dropout (LDO) regulator for generating an output voltage on an output from an input voltage of an input source. The LDO regulator including a switch module to generate the output voltage. The switch module including at least two parallel connected switches responsive to corresponding switch control signals to regulate a flow of energy from the input source to the output. Each of the switches having an on-state and an off-state. A digital controller to sense the output voltage and in response to generate the switch control signals such that the output voltage is regulated to a predetermined amplitude.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a block diagram of an aspect of a 2:-1 buck regulator.
FIG. 4B is a circuit diagram of an aspect of a 2:-11 buck regulator.
FIG. 5 is a circuit diagram of an aspect of a 1:2 boost regulator having synchronous rectifiers.

FIG. 19A is a block diagram of an aspect of a power system for supplying power to digital logic.

FIG. 20A is a graphical representation of voltage positioning.

FIG. 20B is a graphical representation of the output voltage and output current of a conventional DC/DC converter during an output current transient.

FIG. 20C is a graphical representation of the output voltage and output current of a conventional DC/DC converter with voltage positioning.

FIG. 20D is a graphical representation of the output voltage and output current of an aspect of an LDO regulator.

FIG. 25A is a block diagram of an aspect of a multi-chip module having an LDO regulator and digital logic.

FIG. 25B is a two-dimensional view of an aspect of a multi-chip module having an LDO regulator and digital logic.

FIG. 26A is a block diagram of an aspect of a digital logic system fabricated on a single semiconductor die.

FIG. 26B is a two-dimensional view of an aspect of a digital logic system fabricated on a single semiconductor die and having an LDO regulator and digital logic.

Like reference symbols in the various drawings indicate like elements.

DETAILED DESCRIPTION

Figure 1A:
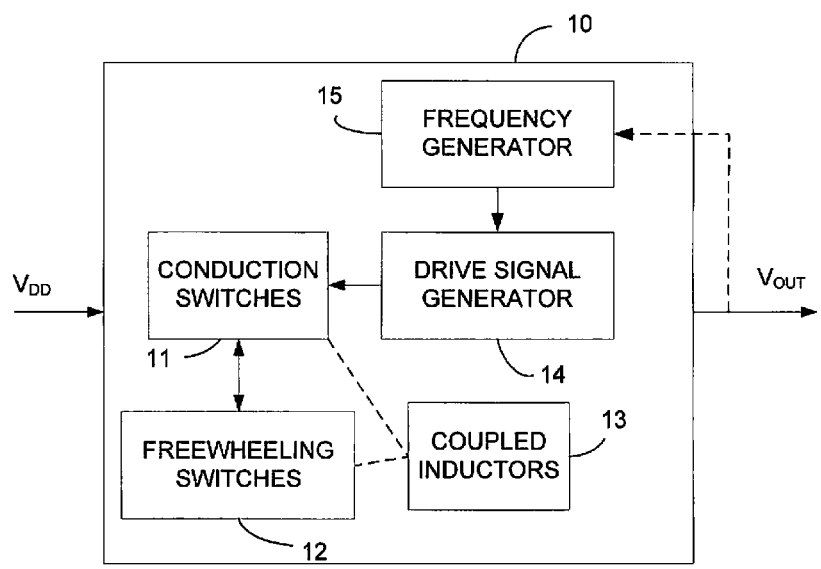
FIG. 1A is a block diagram of an aspect of a coupled inductor regulator.

FIG. 1 shows a block diagram of an aspect of a coupled-inductor regulator 10 for supplying power to one or more devices such as high-speed drivers and other electronic devices. The coupled inductor regulator 10 may operate open-loop to convert an input voltage, $V_{DD}$, to a non-isolated output voltage, $V_{OUT}$. The amplitude of the output voltage is approximately an integer multiple or divisor of the input voltage and may be determined by the configuration of the coupled-inductor regulator 10 and the quantity of coupled inductors in the coupled-inductor regulator 10. For example in a buck configuration having two coupled inductors, the coupled-inductor regulator 10 may generate an output voltage that is approximately one-half of the input voltage.

The coupled-inductor regulator 10 may include conduction switches 11, freewheeling switches 12, and two or more coupled inductors 13 arranged in a buck, a flyback, or a boost configuration. A drive signal generator 14 may generate drive signals to control the conduction switches 11. The drive signals are controlled to generate a total conduction time approaching 100%, negating a small amount of deadtime to reduce cross-conduction between the conduction switches 11 and the freewheeling switches 12.

A frequency generator 15 may generate a clock signal having an operating frequency. The drive signals may be synchronized to operate at the operating frequency. In one aspect, the operating frequency may be fixed to a predetermined frequency. In another aspect, the operating frequency may be controlled in response to changes in load conditions such as output current and output voltage. For example, when a change in the output current, such as an increase in load current, is sensed, the operating frequency may be increased to increase the transient response of the output. Once the coupled inductor regulator 10 has responded to the change in load condition and has reached steady-state operating conditions again, the operating frequency may be decreased to reduce power losses in the coupled inductor regulator 10.

The coupled inductors 13 may be tightly coupled together preferably having a coefficient of coupling, K, of approximately one, where unity is the ideal value. Preferably the inductors 13 are wound together on a common magnetic core to form an inductor assembly that provides the maximum value of coefficient of coupling. The coefficient of coupling is approximately one being at least 0.9 and preferably greater than 0.99. The polarity for each of the windings for the coupled inductors 13 are selected so that DC currents flowing through the coupled inductors 13 approximately cancel, leading to approximately zero DC current flowing through the magnetic core of the inductor assembly. Since there is virtually no DC current flowing through the inductor assembly, a smaller core size may be used for the coupled inductors resulting in a smaller size (volume) and lower cost for the inductor assembly. In addition, high permeability core materials may be used for the magnetic core such as ferrites having shapes such as bead and toroid. Lower permeability materials may also be used such as MPP cores, ferrite PQ cores, and other split core shapes.

In addition to the steady-state advantages obtained by maximizing the coefficient of coupling between the coupled inductors, the transient response of the coupled inductor regulator 10 may also be improved. During a transient, the high mutual coupling between the coupled inductors may effectively cancel the inductance of the individual inductors as far as the transient load current is concerned.

Figure 1B:
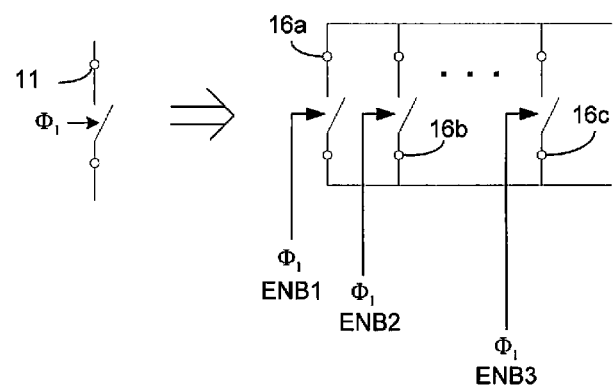
FIG. 1B is a schematic diagram of an aspect of a conduction switch.

FIG. 1B shows an aspect of one of the conduction switches 11 included in the coupled inductor regulator 10. Each of the conduction switches 11 may be comprised of one or more parallel switches, 16a-16c, that are independently controllable. Each of the parallel switches 16a-16c may be controlled by enable signals, ENB1-ENB3, to enable either all or a subset of the parallel switches 16a-16c. The enabled parallel switches 16a-16c may then controlled by the same drive signal, $\Phi_1$.

The conduction switches 11 may also be driven using a multi-level gate voltage to reduce switching losses. For example, the amplitude of the on voltage may be adjusted to differing predetermined levels dependent on factors such as the current flowing through the conduction switch to decrease switching losses in the conduction switch.

Figure 2A:
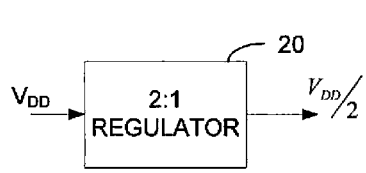
FIG. 2A is a block diagram of an aspect of a 2:1 buck regulator.

FIG. 2A shows an aspect of a 2:1 regulator 20 that may be an embodiment of the coupled inductor regulator 10. The 2:1 regulator 20 may operate open-loop to convert an input voltage, $V_{DD}$, to a non-isolated output voltage that is approximately one-half the amplitude of the input voltage.

Figure 2B:
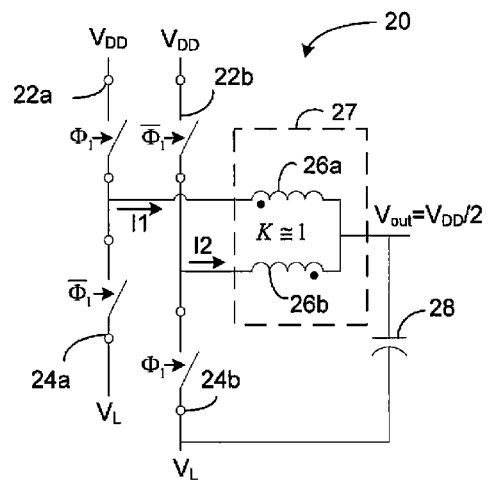
FIG. 2B is a circuit diagram of an aspect of a 2:1 buck regulator.

FIG. 2B shows a schematic diagram of an aspect of the 2:1 regulator 20. The 2:1 regulator 20 may include two buck converters operating 180 degrees out of phase to generate an output voltage, Vout, from an input voltage. The input voltage may be a high-side voltage, $V_H$, referenced to ground or to some other voltage such as a low-side voltage, $V_L$. Each buck converter may include a conduction switch 22a and 22b, a free-wheeling switch 24a and 24b, and an inductor 26a and 26b. An output capacitor 28 may filter the output voltage for each of the buck converters. The value of the output capacitor 28 may be decreased since there is negligible ripple current. In addition, due to the tight coupling between the output and the input of the 2:1 regulator 20, any capacitance at the input works in concert with the output capacitance 28 to effectively provide parallel capacitance to a load at the output.

The inductors, 26a and 26b, may be tightly coupled together preferably having a coefficient of coupling, K, of approximately one, where unity is the ideal value. Preferably the inductors 26a and 26b are wound together on a common magnetic core to form an inductor assembly 27 that provides a high value of coefficient of coupling between the inductors 26a and 26b. The polarities of the inductor windings are selected so that the DC currents flowing through the inductors 26a and 26b approximately cancel so that approximately zero DC current flows through the magnetic core of the inductor assembly 27. Therefore, a smaller core size with a low permeability material may be used for the inductors 26a and 26b, resulting in a smaller size (volume) and lower cost for the inductor assembly 27. In addition, the transient response of the 2:1 buck regulator 20 is improved due to cancellation of the individual inductances as far as transient load currents are concerned.

Any type of switches may be used for the free-wheeling switches 24a and 25b such as synchronous rectifiers and discrete rectifiers.

Using a two level gate voltage for the conduction switches 22a and 22b is particularly advantageous with the 2:1 buck converter 20 since the output voltage, $V_{DD}/2$, may be used as the intermediate level voltage for driving the conduction switches.

Figure 2C:
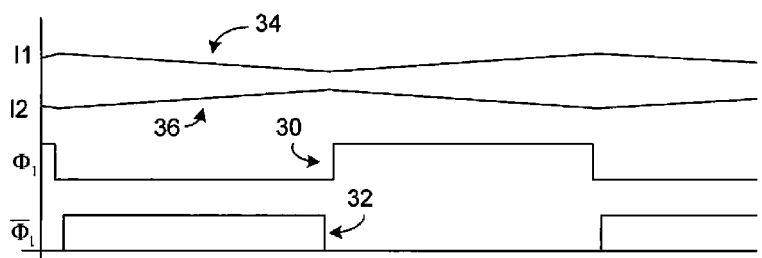
FIG. 2C is a representation of waveforms associated with an aspect of a 2:1 buck regulator.

FIG. 2C shows waveforms associated with an aspect of the 2:1 Regulator 20. Each of the conduction switches 22a and 22b are controlled by drive signals that are operated approximately 180 degrees out-of-phase. The first conduction switch 22a may be driven by a signal $\Phi_1$, 30, that is approximately a square-wave. The second conduction switch 22b may be driven a second signal $\overline{\Phi}_1$, 32, that is approximately the inverse of signal $\Phi_1$, 30. A minimal amount of deadtime may be included between $\Phi_1$ and $\overline{\Phi}_1$ to decrease any shoot-through currents that may flow from the conduction switches 22a and 22b through the freewheeling switches 24a and 24b during switching transitions. The amount of deadtime may be minimized to decrease the ripple current and to improve the transfer of energy to the output. When the first conduction switch 22a is conducting, the current, I1, 34 flowing through the output inductor 26a increases at a linear rate. Similarly, when the second conduction switch 22b is conducting, the current, I2, 36 flowing through the output inductor 26b increases at a linear rate. Since the combined conduction time of the conduction switches 22a and 22b approaches 100%, the amplitude of the ripple current flowing to the output capacitor 28 is negligible, leading to a smaller output capacitor 28 for filtering the output.

Figure 3B:
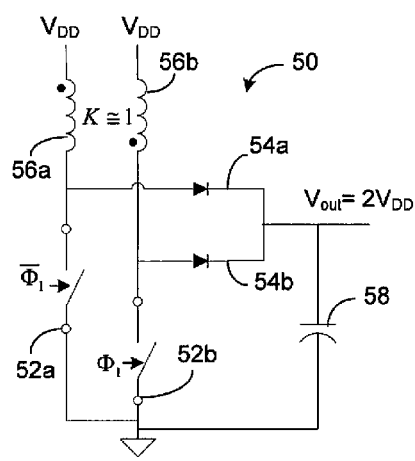
FIG. 3B is a circuit diagram of an aspect of a 1:2 boost regulator.
Figure 3A:
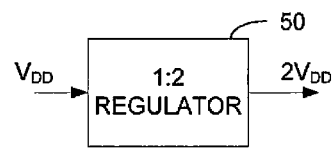
FIG. 3A is a block diagram of an aspect of a 1:2 boost regulator.

FIG. 3A shows an aspect of a 1:2 Regulator 50 that may be an embodiment of the coupled inductor regulator 10. The 1:2 regulator 50 may operate open-loop to convert an input voltage, $V_{DD}$, to a non-isolated output voltage that is approximately twice the amplitude of the input voltage.

FIG. 3B shows a schematic diagram of an aspect of the 1:2 regulator 50. The 1:2 regulator 50 may include two boost converters operating 180 degrees out of phase to generate an output voltage, Vout, from an input voltage. The input voltage may be a high-side voltage, $V_H$, referenced to ground or to some other voltage such as a low-side voltage, $V_L$. Each boost converter may include a conduction switch 52a and 52b, a free-wheeling switch 54a and 54b, and an inductor 56a and 56b. An output capacitor 58 may filter the output voltage for each of the boost converters. Similar to the 2:1 regulator 20, the value of the output capacitor 58 may be decreased since there is negligible ripple current, and due to the tight coupling between the output and the input of the 1:2 regulator 50, any capacitance at the input works in concert with the output capacitance 58 to effectively provide parallel capacitance to a load at the output.

Each of the conduction switches 52a and 52b are controlled by drive signals that are operated approximately 180 degrees out-of-phase. The first conduction switch 52a may be driven by a signal $\Phi_1$ that is approximately a square-wave. The second conduction switch 52b may be driven a second signal $\overline{\Phi}_1$ that is approximately the inverse of signal $\Phi_1$. A minimal amount of deadtime may be included between $\Phi_1$ and $\overline{\Phi}_1$ to decrease any shoot-through currents that may flow from the conduction switches 52a and 52b through the freewheeling switches 54a and 54b during switching transitions. The amount of deadtime may be minimized to decrease the ripple current and to improve the transfer of energy to the output. Since the combined conduction time of the conduction switches 52a and 52b approaches 100%, the amplitude of the ripple current flowing to the output capacitor 58 is negligible, leading to a smaller output capacitor 58 for filtering the output.

The inductors, 56a and 56b, for each of the boost converters may be tightly coupled together preferably having a coefficient of coupling, K, of approximately one. The inductors 56a and 56b may be wound together on a single magnetic core to form an inductor assembly 57 that provides a high value of coefficient of coupling. The benefits of having a high coefficient of coupling are similar to those of the 2:1 regulator 20 and the coupled inductor regulator 10.

Any type of switches may be used for the free-wheeling switches 54a and 55b such as synchronous rectifiers and discrete rectifiers.

FIG. 4A shows an aspect of a 1:−1 regulator 60 that may be an embodiment of the coupled inductor regulator 10. The 1:−1 regulator 60 may operate open-loop to convert an input voltage, $V_{DD}$, to a non-isolated output voltage that is approximately the negative of the input voltage.

FIG. 4B shows a schematic of an aspect of the 1:−1 regulator 60. The 1:−1 regulator 60 is similar to the 2:1 regulator 20 in function with corresponding elements numbered in the range 60-68, except that the 1:−1 regulator 60 may include two flyback regulators operating at approximately 50% duty cycle to generate an output that is the negative of the input voltage.

FIG. 5 shows an aspect of a coupled inductor regulator 70 that is similar to 1:2 regulator 50 in function with corresponding elements numbered in the range 70-78, except that the coupled inductor regulator 70 includes synchronous rectifiers 74a and 74b to rectify the output signals from the conduction switches 72a and 72b. The synchronous rectifiers 74a and 74b may advantageously reduce losses associated with rectifying the output signals, thereby increasing the energy efficiency of the coupled inductor regulator 70. Although the synchronous rectifiers are illustrated as included in the boost configuration of the coupled inductor regulator, the synchronous rectifiers may be used as the freewheeling rectifiers in any embodiment of the coupled inductor regulator 10.

Figure 6A:
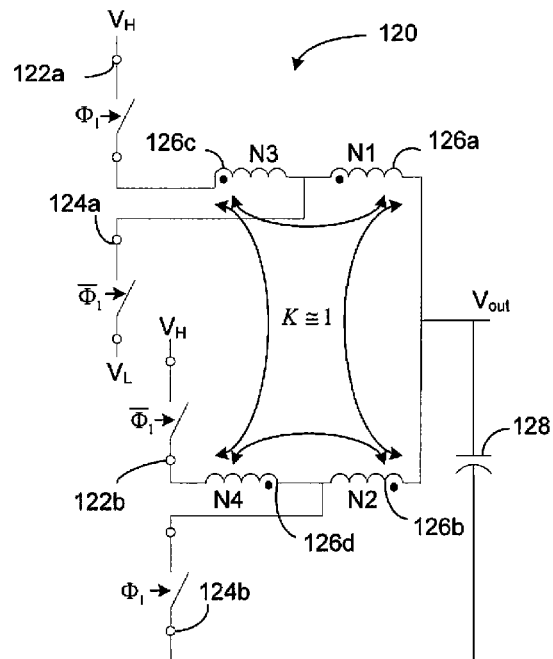
FIG. 6A is a schematic of an aspect of a buck configuration coupled inductor regulator having four coupled inductors.

FIG. 6A shows another aspect of a coupled inductor regulator 120 for converting an input voltage to an output voltage, Vout. The coupled inductor regulator 120 is similar to the 2:1 regulator 20 in function with corresponding elements numbered in the range 120-128, except that the coupled inductor regulator 120 includes four coupled inductors 126a-126d having a coefficient of coupling approaching 1. Each of the coupled inductors 126a-126d may be wound with a predetermined number of turns, N1-N4 so that each of the coupled inductors may have an individually controllable number of turns. The ratio of the turns of each coupled inductor to the other coupled inductors may be varied to control the amplitude of the output voltage, Vout. For example, in one aspect the turns may be set so that N1=N2=N3=N4, in which case the amplitude of the output voltage will be approximately equal to one-fourth of the input voltage. In another aspect the turns may be set so that N1=N2, N3=N4, and N1=2*N3, in which case the amplitude of the output voltage will be approximately equal to one third of the input voltage.

Figure 6B:
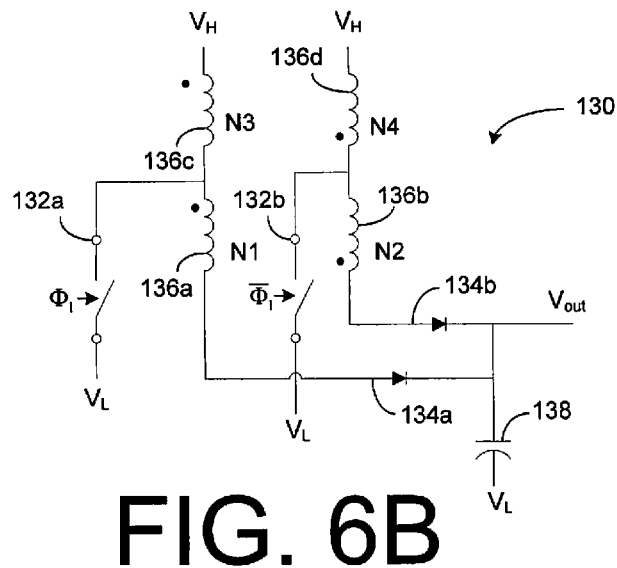
FIG. 6B is a schematic of an aspect of a boost configuration coupled inductor regulator having four coupled inductors.

FIG. 6B shows another aspect of a coupled inductor regulator 130 for converting an input voltage to an output voltage, Vout. The coupled inductor regulator 130 is similar to the 1:2 regulator 50 in function with corresponding elements numbered in the range 130-138, except that the coupled inductor regulator 130 includes four coupled inductors 136a-136d having a coefficient of coupling approaching 1. Each of the coupled inductors 136a-136d may be wound with a predetermined number of turns, N1-N4 so that each of the coupled inductors may have an individually controllable number of turns. The ratio of the turns of each coupled inductor to the other coupled inductors may be varied to control the amplitude of the output voltage, Vout.

Figure 6C:
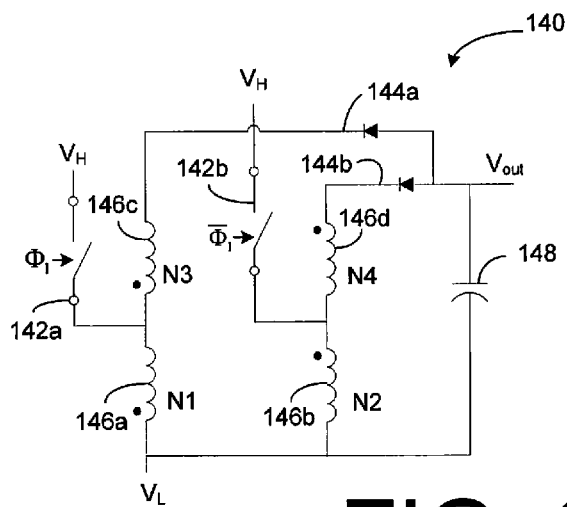
FIG. 6C is a schematic of an aspect of a flyback configuration coupled inductor regulator having four coupled inductors.

FIG. 6C shows another aspect of a coupled inductor regulator 140 for converting an input voltage to an output voltage, Vout. The coupled inductor regulator 140 is similar to the 1:−1 regulator 60 in function with corresponding elements numbered in the range 140-148, except that the coupled inductor regulator 140 includes four coupled inductors 146a-146d having a coefficient of coupling approaching 1. Each of the coupled inductors 146a-146d may be wound with a predetermined number of turns, N1-N4 so that each of the coupled inductors may have an individually controllable number of turns. The ratio of the turns of each coupled inductor to the other coupled inductors may be varied to control the amplitude of the output voltage, Vout.

Figure 16A:
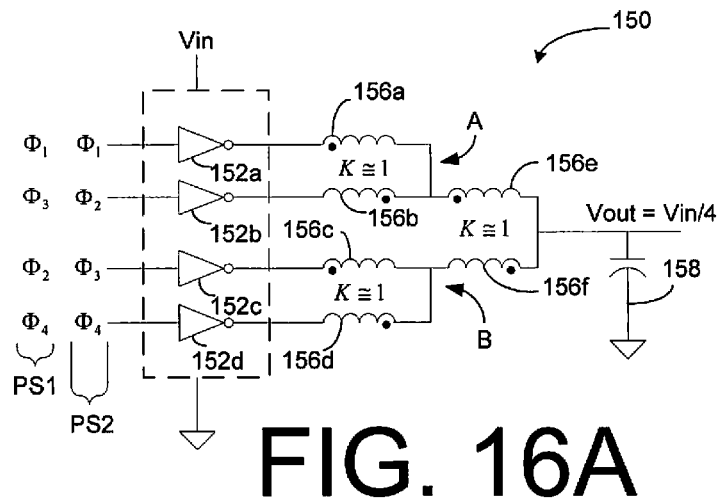
FIG. 16A is a schematic of an aspect of a buck configuration coupled inductor regulator for generating an output voltage that is approximately one-fourth the amplitude of the input voltage.

FIG. 16A shows an aspect of a 4:1 regulator 150 for generating an output voltage, Vout, from an input voltage, Vin. The 4:1 regulator 150 may operate open-loop to generate Vout as a non-isolated voltage that is approximately one-fourth the amplitude of Vin. The 4:1 regulator 150 may include four drivers 152a-152d to buffer phase signals, $\phi1$-$\phi4$, corresponding to each of the drivers 152a-152d. The drivers 152a-152d may be in communication with six coupled inductors 156a-156f arranged in a lattice network.

Pairs of the coupled inductors 156a-156b, 156c-156d, and 156e-156f may each be tightly coupled together preferably having a coefficient of coupling, K, of approximately one. Preferably each pairs of inductor 156a-156b, 156c-156d, and 156e-156f is wound together on a corresponding common magnetic core to form inductor assemblies that may provide a high value of coefficient of coupling between the inductors 156a-156b, 156c-156d, and 156e-156f. The polarities of the inductor windings are selected so that the DC currents flowing through each pair of inductors 156a-156b, 156c-156d, and 156e-156f approximately cancel so that approximately zero DC current flows through the magnetic core of the corresponding inductor assembly. In another aspect, all of the inductors 156a-156f may be wound on a single magnetic core.

The drivers 152a-152d may advantageously be included on a single semiconductor die to reduce cost, or decrease the volume of the 4:1 regulator. The phase signals each may have an on-state and an off-state, and a duty cycle of approximately 25%. The phase signals may be arranged in a timing sequence such as in one aspect, an alternating timing sequence, PS1, and in another aspect the phase signals may be arranged in a sequential timing sequence, PS2. In the alternating timing sequence PS1, phase signals $\phi1$-$\phi3$-$\phi2$-$\phi4$ respectively are applied to the drivers 152a-152b-152c-152d (see FIG. 16B). In the sequential timing sequence PS2, phase signals $\phi1$-$\phi2$-$\phi3$-$\phi4$ respectively are applied to the drivers 152a-152b-152c-152d. The coupled inductors 156a-156f preferably have a coefficient of coupling approaching 1 and may be wound with approximately an equal number of turns on the same magnetic core structure. An output capacitor 158 may filter the output voltage to reduce noise and ripple voltage. Similar to the 2:1 regulator 20 the value of the output capacitor 158 may be decreased since there is negligible ripple current, and the capacitance at the input works in concert with the output capacitance.

Figure 16B:
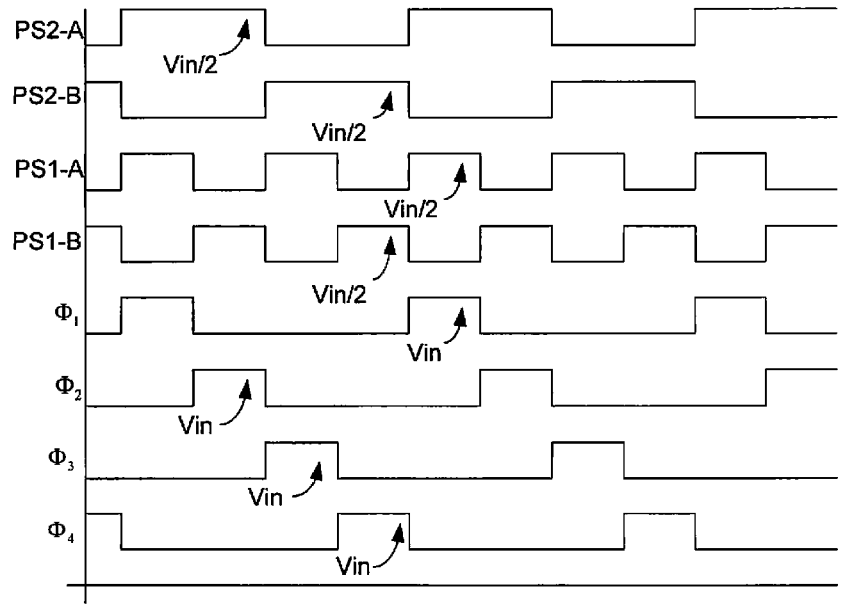
FIG. 16B is a timing diagram of signals corresponding to an aspect of a buck configuration coupled inductor regulator.

FIG. 16B shows signals and waveforms associated with an aspect of the 4:1 regulator 150. The phase signals, $\phi1$-$\phi4$, show the timing relationship between each of the phases, $\phi1$-$\phi4$. Each of the phases, $\phi1$-$\phi4$, may have a duty cycle of approximately 25% and an amplitude of approximately Vin. Signal PS2-A shows the waveform at node A of FIG. 16A when the PS2 phase sequence of the phase signals, $\phi1$-$\phi4$ is applied to the drivers 152a-152d. Signal PS2-B shows the waveform at node B of FIG. 16A when the PS2 phase sequence of the phase signals, $\phi1$-$\phi4$ is applied to the drivers 152a-152d. The amplitude of signals PS2-A and PS2-B may be approximately Vin/2.

Signal PS1-A shows the waveform at node A of FIG. 16A when the PS1 phase sequence of the phase signals, $\phi1$-$\phi4$ is applied to the drivers 152a-152d. Signal PS1-B shows the waveform at node B of FIG. 16A when the PS1 phase sequence of the phase signals, $\phi1$-$\phi4$ is applied to the drivers 152a-152d. The amplitude of signals PS1-A and PS1-B may be approximately Vin/2. The signal frequency of signals PS1-A and PS1-B is approximately twice the frequency of signals PS2-A and PS2-B leading to potentially smaller inductance values when the PS1 timing sequence is used versus the PS2 timing sequence.

Figure 16C:
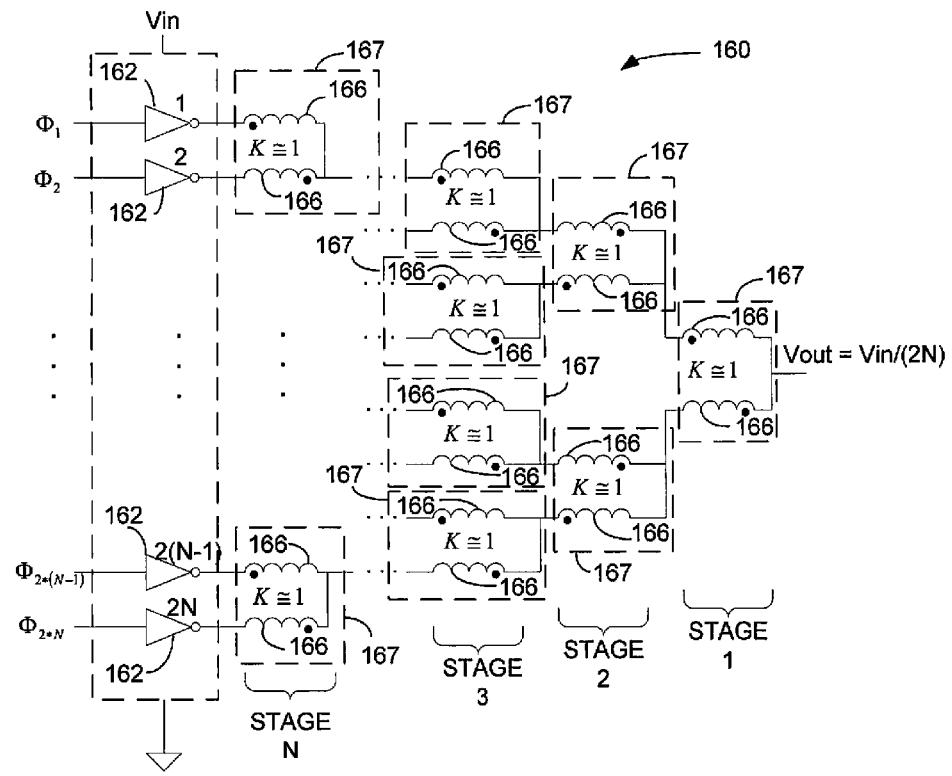
FIG. 16C is a schematic of an aspect of another buck configuration coupled inductor regulator having coupled inductors.

FIG. 16C shows an aspect of a coupled inductor regulator 160 for generating an output voltage, Vout, from an input voltage, Vin. The coupled inductor regulator 160 is in a buck configuration and may include multiple coupled inductors 166 arranged in a lattice network having any quantity of stages ranging from 1 to N. The coupled inductor regulator 160 may operate open-loop to generate Vout as a non-isolated voltage that is approximately equal to Vin/(2N). The coupled inductor regulator 160 may include drivers 162 to buffer phase signals, $\phi_1$-$\phi_{2N}$, corresponding to each of the drivers 162. Each of the phase signals, $\phi_1$-$\phi_{2N}$, may have a duty cycle of approximately (100/2N) % and an amplitude of Vin. The phase signals may be arranged in any timing sequence such as PS1 and PS2 as shown with the 4:1 regulator 150.

Pairs of the coupled inductors 167 within each stage may be tightly coupled together preferably having a coefficient of coupling, K, of approximately one. Preferably each pair of inductors 167 is wound together on a corresponding common magnetic core to form inductor assemblies that may provide a high value of coefficient of coupling between the inductors 166. For example, stage two may have two inductor assemblies and stage three may have four inductor assemblies. The polarities of the inductor windings are selected so that the DC currents flowing through each pair of inductors 167 approximately cancel so that approximately zero DC current flows through the magnetic core of the corresponding inductor assembly. In another aspect, all of the inductors 166 may be wound on a single magnetic core.

Figures 7A, 7B:
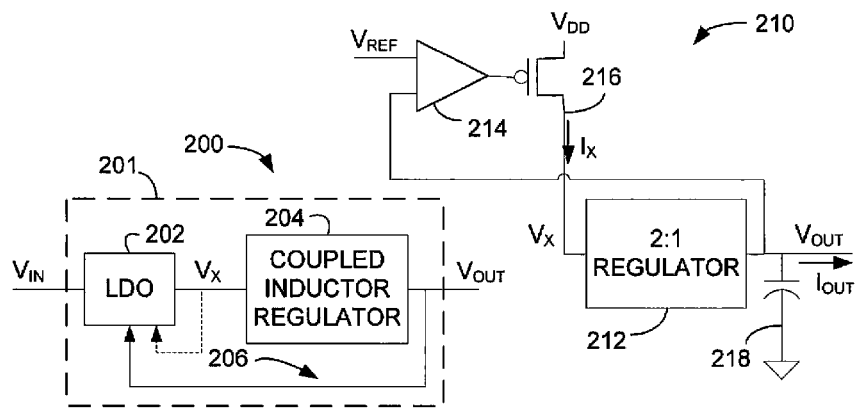
FIG. 7A is a block diagram of an aspect of a low dropout device combined with a 2:1 Regulator.
FIG. 7B is a schematic diagram of an aspect of a low dropout device combined with a 2:1 Regulator.

FIG. 7A shows an aspect of a regulator system 200 for generating a regulated output voltage, Vout, from an input voltage, Vin. The regulator system 200 includes a low dropout regulator, LDO, 202 in series with a coupled inductor regulator 204. The LDO 202 may control the LDO output, Vx, as a function of one or more feedback signals. In one aspect, a feedback signal 206 from the output of the coupled inductor regulator 204 may communicate a sample of Vout to the LDO 202 to be compared to a reference voltage. The LDO 202 may regulate the LDO voltage, Vx, as a function of comparing Vout to the reference voltage. The coupled inductor regulator 204 may generate Vout as a function of a fixed ratio of Vx. For example, if a 2:1 regulator is used for the coupled inductor regulator 204, then Vout is approximately equal to one-half the amplitude of Vx. In another example, if a 1:2 regulator is used for the coupled inductor regulator 204, then Vout is approximately equal to twice the amplitude of Vx. In another aspect, multiple feedback signals may be used for multi-loop control of the regulator system 200. Any multi-loop control techniques may be employed such as weighted feedback signals, selecting one feedback signal from amongst the multiple feedback signals, and varying the response time of each feedback loop. For example, the inner feedback loop from Vx to the LDO 202 may be set slower than an outer loop from Vout to the LDO 202. Any type of linear regulator may be used for the low drop out regulator. In one aspect the LDO 202 and the coupled inductor regulator 204 may be fabricated on a single integrated circuit 201 with separate inductor assemblies for the output inductors and coupled inductors. In another aspect, the order of the coupled inductor regulator 204 and the LDO 202 may be reversed so that the coupled inductor regulator 204 generates the intermediate voltage, Vx, from the input voltage, Vin, and the LDO 202 generates the output voltage, Vout. The LDO 202 may receive a feedback signal from Vout and a feedforward signal from the intermediate voltage.

FIG. 7B shows an aspect of a preferred embodiment of a regulator system 210 in which a combination of a reference amplifier 214 and Field Effect Transistor 216 form an LDO having an LDO output, Vx. A 2:1 regulator 212 generates an output voltage, Vout, from Vx, where Vout is approximately equal to one-half of the amplitude of Vx. An output capacitor 214 may filter the output from the 2:1 regulator 212. The regulator system 210 advantageously only requires the LDO to supply a current, Ix, that is one-half the amplitude of the output current, Iout, thereby lowering the cost of the FET 204 and heat sink requirements for the LDO. A capacitor 218 may also be included at the output of the FET 216 to possibly improve the stability of the LDO. In one exemplary regulator system 210, Vin may be 3.3V and Vout may be in the range of 1.2V to 1.5V. In another exemplary regulator system 210, Vin may 2.5V and Vout may be in the range of 0.8V to 1.2V.

Figures 8, 9A:
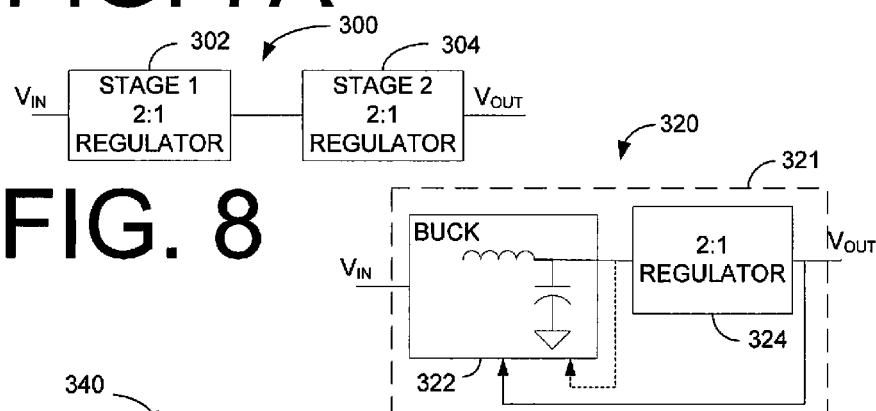
FIG. 8 is a block diagram of an aspect of a multi-stage regulator system.
FIG. 9A is a block diagram of an aspect of buck regulator combined with a 2:1 Regulator.

FIG. 8 shows an aspect of a two stage regulator system 300 for generating an output voltage, Vout, that is approximately equal to one-fourth of the amplitude of the input voltage, Vin. A first stage 2:1 regulator 302 is connected in series with a second stage 2:1 regulator 304. The first stage 2:1 regulator 302 may operate at twice the voltage, but half of the current of the second stage 2:1 regulator 304. Since the two stages 302 and 304 operate at different voltages, the semiconductor processes used for each of the stages 302 and 304 may be optimized for the operating voltage. For example, the first stage 2:1 regulator 302 may be made using a 0.5 um equivalent logic transistor process, while the second stage 2:1 regulator 304 may be made using a 0.25 um equivalent logic transistor process. Selecting the process to be used for each regulator stage based on the voltage of the stage may be applied to any of the embodiments of the coupled inductor regulator as well as any configuration of coupled inductor regulators such as a combination of series, parallel, and tapped coupled inductor regulators. By optimizing the process that is used for each of the coupled inductor regulators, the die size may be reduced leading to a substantial decrease in cost.

FIG. 9A shows an aspect of a very low voltage high current regulator 320 (VLVHC regulator) for generating a low voltage output. The VLVHC regulator 320 may include a buck converter 322 followed by a 2:1 regulator 324. In one aspect the buck converter 322 and the 2:1 regulator 324 may be fabricated on a single integrated circuit 201 with separate inductor assemblies for the output inductors and coupled inductors. The buck converter 322 may be any type of buck converter such as a traditional buck converter having one or more output phases. One or more feedback signals for controlling the output of the buck converter 322 may be communicated to the buck converter 322 from various points in the VLVHC regulator 320 such as the output of the 2:1 regulator 324 and the output of the buck converter 322. Since the output current of the buck converter 322 is half the amplitude that it would be if a single buck converter converted Vin directly to Vout, the output devices of the buck converter 322 may advantageously be reduced in size by a factor of at least 2 compared to generating Vout with only a single buck converter. The output devices may include devices such as output capacitors and output inductors. The invention advantageously recognizes that the ripple voltage at the output of the 2:1 regulator 324 will be reduced by a factor of two from the ripple voltage at the output of the buck converter 322, therefore smaller output devices may be used for the buck converter 322. In addition, the volumetric efficiency of capacitors is typically directly related to the voltage rating of a capacitor so that typically the volume of a capacitor decreases by $$(V_H/V_L)^2$$

as the voltage rating of the capacitor rating increases, where VH is the higher voltage rating and VL is the lower voltage rating. In addition, the volume of inductors is directly related to the square of the current that flows through an inductor, so that the volume of an inductor decreases as the maximum rated current of the inductor decreases. In one aspect, multiple feedback signals may be used for multi-loop control of the VLVHC regulator 320. Any multi-loop control techniques may be employed such as weighted feedback signals, selecting one feedback signal from amongst the multiple feedback signals, and varying the response time of each feedback loop. For example, the inner feedback loop from the buck converter output to the buck converter 322 may be set slower than an outer loop from Vout to the buck converter 322.

Figure 9B:
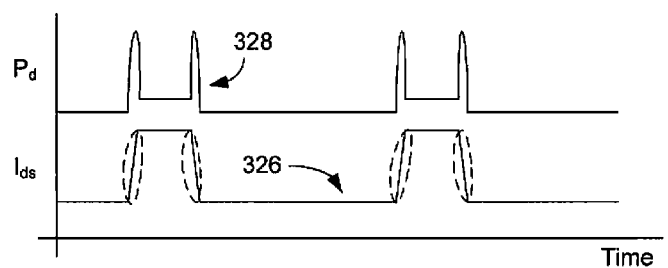
FIG. 9B is a graphical representation of the current and power dissipation in a conduction switch of a buck converter.

In addition, the overall power efficiency of the VLVHC regulator 320 may be lower than if only a non-isolated buck converter were used to convert Vin to Vout. FIG. 9B shows a waveform 326 of current, Ids, flowing through a conduction switch in a non-isolated buck converter that generates Vout from Vin. The duty cycle in the buck converter may be approximately four times lower than the duty cycle in the VLVHC regulator 320. Since the duty cycle is lower, the peak current, Ids, flowing through the conduction switch may be approximately four times greater than the peak current flowing through the conduction switch of the VLVHC regulator 320, leading to switching losses in the buck converter that may be approximately four times greater the switching losses in the buck converter of the VLVHC regulator 320. A waveform 328 of the power dissipation, Pd, in the conduction switches of the non-isolated buck converter shows the high switching losses occurring during switching of the conduction switches.

Figure 10A:
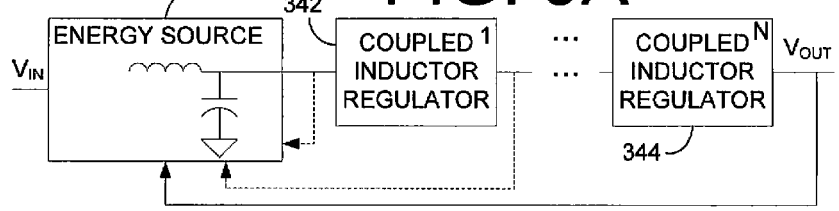
FIG. 10A is a block diagram of an aspect of multiple 2:1 Regulators combined in series with a buck regulator.

FIG. 10A shows another aspect of a very low voltage high current regulator 340 (VLVHC regulator) for generating a low voltage output. The VLVHC regulator 340 is similar to the VLVHC regulator 320 in function, except that the VLVHC regulator 340 may include two or more coupled inductor regulators 342 and 344 following an energy source 346. The coupled inductor regulators 342 and 344 are preferably a buck version (2:1 regulator, 3:1 regulator, 4:1 regulator, etc.) of the coupled inductor regulator to take advantage of the decrease in size of the output devices of the energy source 346, however the scope of the invention includes any embodiment of the coupled inductor regulator such as a boost regulator having a 1:2 boost ratio.

Figure 10B:
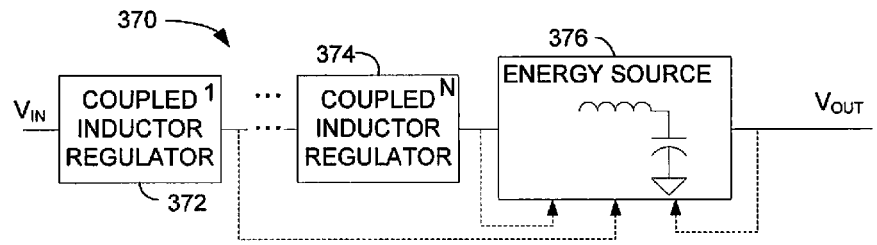
FIG. 10B is a block diagram of another aspect of multiple 2:1 Regulators combined in series with a buck regulator.

FIG. 10B shows another aspect of a very low voltage high current regulator 370 (VLVHC regulator) for generating a low voltage output. The VLVHC regulator 370 is similar to the VLVHC regulator 340 in function, except that the VLVHC regulator 370 may include two or more coupled inductor regulators 372 and 374 preceding an energy source 376. The coupled inductor regulators 372 and 374 may be any configuration such as a buck configuration (2:1 regulator, 3:1 regulator, 4:1 regulator, etc.), a boost configuration (1:2 regulator), and a flyback configuration (1:−1 regulator) of the coupled inductor regulator.

Figure 11:
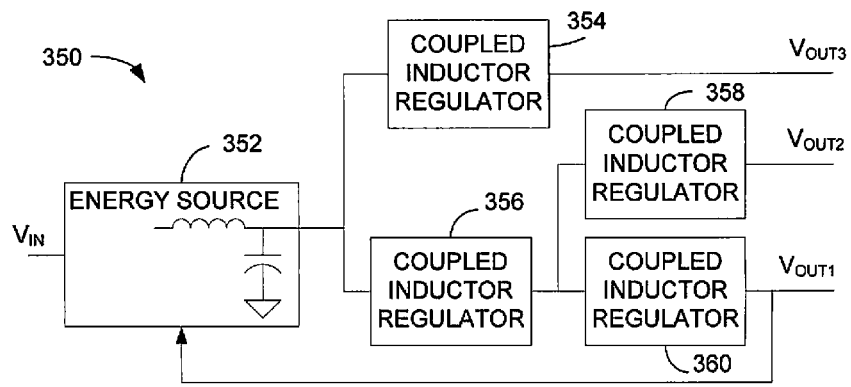
FIG. 11 is a block diagram of an aspect of a regulator system having multiple coupled inductor regulators.

FIG. 11 shows an aspect of a multi-stage regulator system 350 for converting an input voltage, Vin, to several output voltages, Vout1-Vout3. The multi-stage regulator system 350 may include an energy source 352 such as a buck converter connected to two or more coupled inductor regulators 354-360. The multi-stage regulator system 350 may advantageously generate several intermediate voltages such as Vout1-Vout3, while minimizing the cost of the overall implementation by reducing the cost of the output devices of the energy source 352.

Figures 12A, 12B:
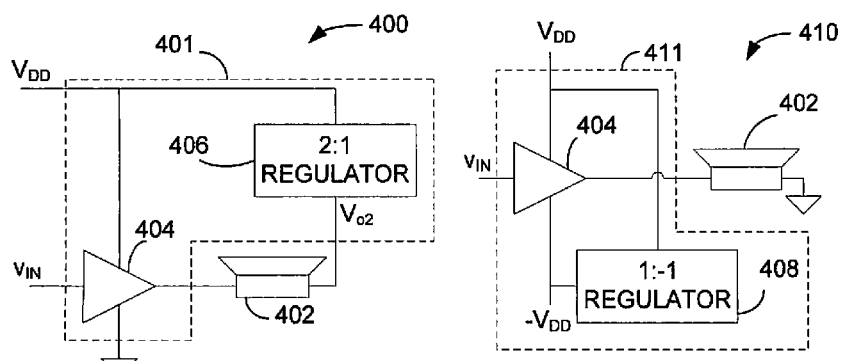
FIG. 12A is a block diagram of an aspect of an amplifier system.
FIG. 12B is a block diagram of another aspect of an amplifier system.

FIGS. 12A and 12B show aspects of single supply amplifier systems 400 and 410 for powering a load such as a speaker 402 from a power amplifier 404. Conventional single supply amplifier systems include a large DC blocking capacitor in series with the load and power amplifier to remove any DC components from the signal from the signal that drives the load. The single supply amplifier system 400 advantageously may use a coupled inductor regulator to generate a second supply voltage, $V_{o2}$, from the first supply voltage $V_{DD}$. The second supply voltage may be used to eliminate DC voltage from appearing across the load 402.

In one aspect, a 2:1 regulator 406 may generate a voltage, $V_{o2}$, that is approximately one-half of the amplitude of $V_{DD}$. The voltage, $V_{o2}$, may be applied to one end of the load 402 to bias the load 402 so that no DC voltage appears across the load 402, thereby eliminating the need for a DC blocking capacitor. In one aspect the 2:1 regulator 406 and the power amplifier 404 may be fabricated on a single integrated circuit 401.

In another aspect, a 1:−2 regulator 408 may generate a voltage, $-V_{DD}$, that is the negative of the high side supply voltage, $V_{DD}$, for the power amplifier 404. The voltage $-V_{DD}$ is used as the low side supply voltage for the power amplifier 404 to convert the power amplifier 404 into a dual power supply amplifier. The power amplifier 404 may then generate generates an output that is approximately centered about zero volts and has approximately no DC component, thereby eliminating the need for a DC blocking capacitor. In one aspect the 1:−1 regulator 408 and the power amplifier 404 may be fabricated on a single integrated circuit 411.

Figure 13:
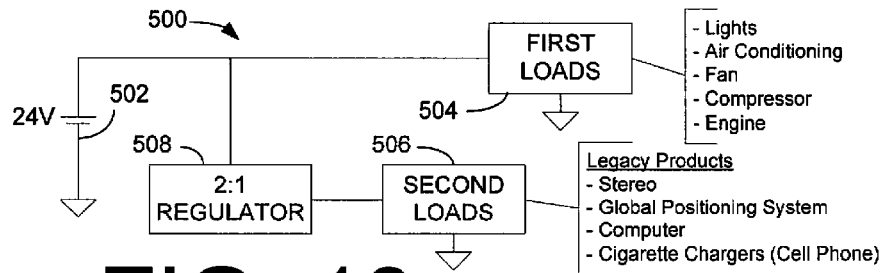
FIG. 13 is a block diagram of an aspect of a vehicle electrical system.

FIG. 13 shows a vehicle electrical system 500 that may be powered by a 24 volt battery 502. The vehicle electrical system 500 may include a mixture of both 24 volt loads 504 and 12 volt loads 506. For example, the basic electrical systems of an automobile such as the engine, compressor, fan, lights, and air conditioning may all be driven from the 24 volt battery 502. Whereas, one or more accessories for the automobile such as a stereo, computer, cigarette charger, and global positioning system may have been designed for a 12 volt automotive system and therefore require a 12 volt supply to provide power. A 2:1 regulator 508 may provide a low cost source of 12 volt power derived from the 24 volt battery 502 so that legacy automotive accessories that require 12 volt power may be employed in the automotive electrical system 500.

Figure 17A:
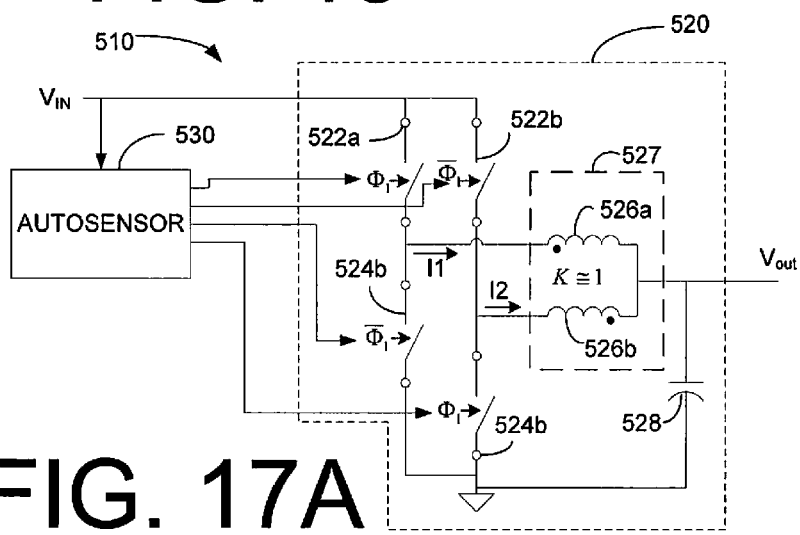
FIG. 17A is a schematic of an aspect of an autosensing coupled inductor regulator having for automatically controlling the amplitude of the output voltage as a function of the input voltage.

FIG. 17A shows an aspect of an autosensing regulator 510 for generating an output voltage, Vout, from an input voltage, Vin. The autosensing regulator 510 is particularly suitable for being used as the 2:1 regulator 508 in the automotive electrical system 500. The autosensing regulator 510 may include an autosensor 530 to sense the input voltage and control a 2:1 regulator 520. The 2:1 regulator may be similar to the 2:1 regulator 20 in function with corresponding elements numbered in the range 520-528. The autosensor 530 may automatically control the 2:1 regulator 520 as a function of the amplitude of the input voltage. For example, when Vin is greater than a predetermined voltage level, the autosensor 530 may set the duty cycle of the conduction switches 522a and 522b to 50% each so that the 2:1 regulator 520 may generate an output voltage that is approximately one-half the amplitude of Vin, and when Vin is less than the predetermined voltage level, the autosensor 530 may set the conduction switches 522a and 522b both to the continuous on-state so that Vout is approximately equal to Vin.

Figure 17B:
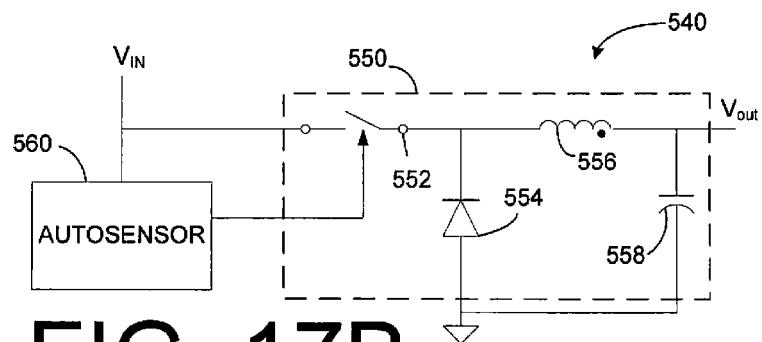
FIG. 17B is a schematic of an aspect of an autosensing buck converter for automatically controlling the amplitude of the output voltage as a function of the input voltage.

FIG. 17B shows another aspect of an autosensing regulator 540 for generating an output voltage, Vout, from an input voltage, Vin. The autosensing regulator 540 may include an autosensor 560 to sense the input voltage and control a conventional buck converter 550 as a function of the amplitude of the input voltage. Any type of buck converter 552 may be employed. The buck converter 550 may include a conduction switch 552, a free-wheeling diode 554, an output inductor 556, and an output capacitor 558. In one aspect, the autosensor may set the conduction switch 552 to the on-state continuously if Vin is less than a predetermined voltage level, and if Vin is greater than the predetermined voltage level the autosensor 560 may enable the conduction switch to be driven by a variable duty cycle signal to maintain a constant output voltage.

Figure 14:
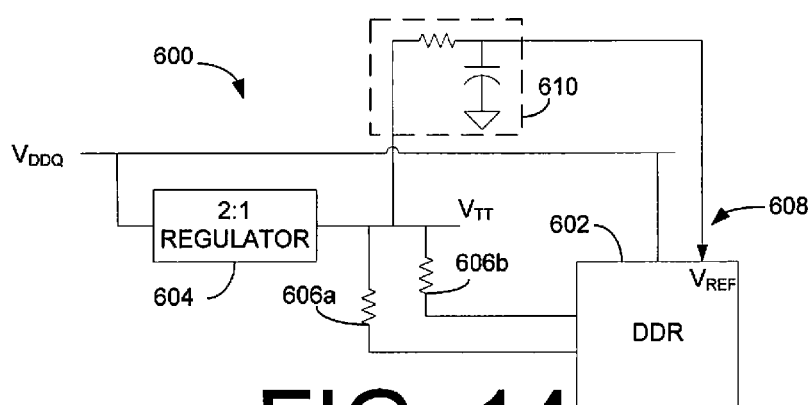
FIG. 14 is a block diagram of an aspect of a power system for high speed drivers.

FIG. 14 shows a driver power system 600 for supplying power to a high speed line driver assembly (DDR) 602. A 2:1 regulator 604 may generate $V_{TT}$ voltage from the $V_{DDQ}$ voltage. The $V_{TT}$ voltage is approximately one-half of the $V_{DDQ}$ voltage. The 2:1 regulator 604 advantageously may use output filter capacitors that are much smaller than conventional regulators may require. The $V_{TT}$ voltage may supply power to termination devices 606a and 606b and the DDR 602. To compensate for a $V_{TT}$ voltage that is not precisely one-half of the $V_{DDQ}$ voltage, a reference voltage, $V_{REF}$, 608 for the DDR 602 may be derived from the VTT voltage. In addition, a filter 610 may filter the reference voltage 608 to attenuate noise components.

Figures 15A, 15B:
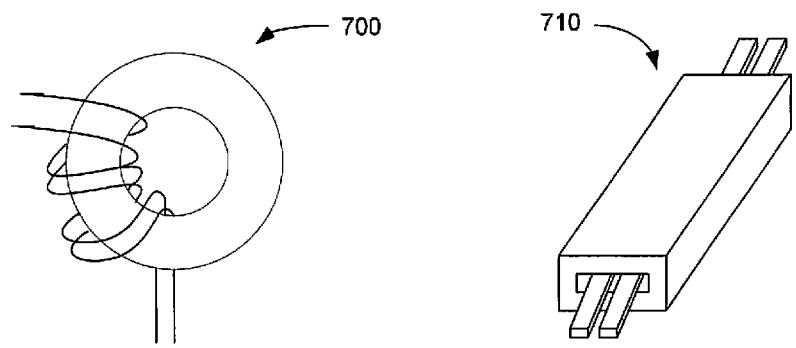
FIG. 15A is a graphical representation of an aspect of a coupled inductor.
FIG. 15B is a graphical representation of an aspect of a coupled inductor.

FIG. 15A shows an aspect of a coupled inductor 700 wound on a torroid. The windings of the coupled inductor 700 are arranged so that DC currents flowing through the windings cancel. By minimizing the combined DC current flowing in the coupled inductor 700, saturation of the torroid is prevented and high permeability materials such as ferrites may used for the torroid to reduce core losses.

FIG. 15B shows another aspect of a coupled inductor 710 wound on a planar assembly. The coupled inductor 710 is similar in function to the coupled inductor 700 such as the windings are arranged so that DC currents flowing through the windings cancel, so that high permeability materials such as ferrites may be used for the core.

Figure 18A:
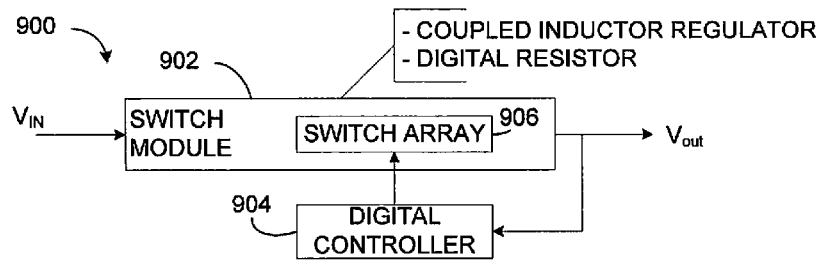
FIG. 18A is a block diagram of an aspect of an LDO regulator.

FIG. 18A shows an aspect of a digital low dropout (LDO) regulator 900 for generating a regulated output voltage, Vout, from an input voltage, Vin. The digital LDO regulator 900 may include a switch module 902 that is controlled by a digital controller 904. The switch module 902 may be implemented as either a coupled inductor regulator or as a digital resistor. The coupled inductor regulator may be any configuration described in this specification such as buck, boost, and flyback configurations. The digital resistor comprises a switch array without any coupled inductors. In each case, a switch array 906 included in the switch module 902 is controlled by the digital controller to control the regulated output voltage. FIG. 18C shows an aspect of a switch array 950. Control signals, CNTL1-CNTLX, may independently control the switches 952 on a cycle-by-cycle basis. The switches 952 may be controlled in groups and individually. In one aspect, the switch array 906 may be implemented as the switch array 1006 shown in FIG. 18B.

Figure 18B:
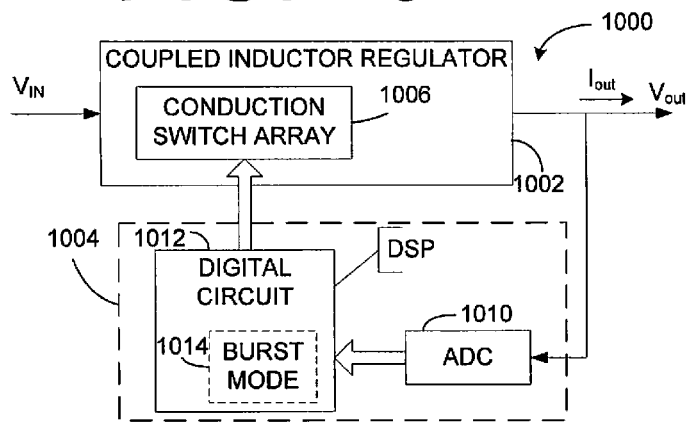
FIG. 18B is a block diagram of an aspect of an LDO regulator.
Figure 18C:
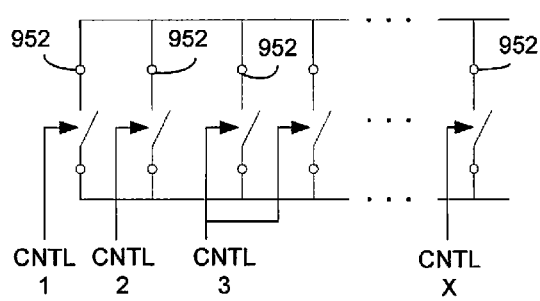
FIG. 18C is a schematic diagram of an aspect of a switch array.

FIG. 18B shows an aspect of a coupled inductor type of digital LDO regulator 1000 for generating a regulated output voltage, Vout, from an input voltage, Vin. The digital LDO regulator 1000 may include a coupled inductor regulator 1002 that is controlled by a digital controller 1004. The coupled inductor regulator 1002 may be any configuration such as buck, boost, and flyback. At least one of the conduction and flyback switches of the coupled inductor regulator 1002 is implemented as a switch array 1006 such as a conduction switch array, a flyback switch array, and combinations thereof. The switch array 1006 may include an array of switches that are controllable on a cycle-by-cycle basis in groups of one or more switches. Any type of switches may be used for the conduction switch array 1006 such as MOSFETs, NMOS, PMOS, and BJTs although an array of MOSFETs on a single integrated circuit is preferable. By controlling the quantity of switches that conduct energy during a conduction cycle the power losses in the conduction switch array may be controlled. For example, if the conduction switch array 1006 is implemented as an array of MOSFETs, the voltage drop across the conduction switch array 1006 may be controlled as a function of the quantity of MOSFETs that conduct energy during a cycle.

Figure 18D:
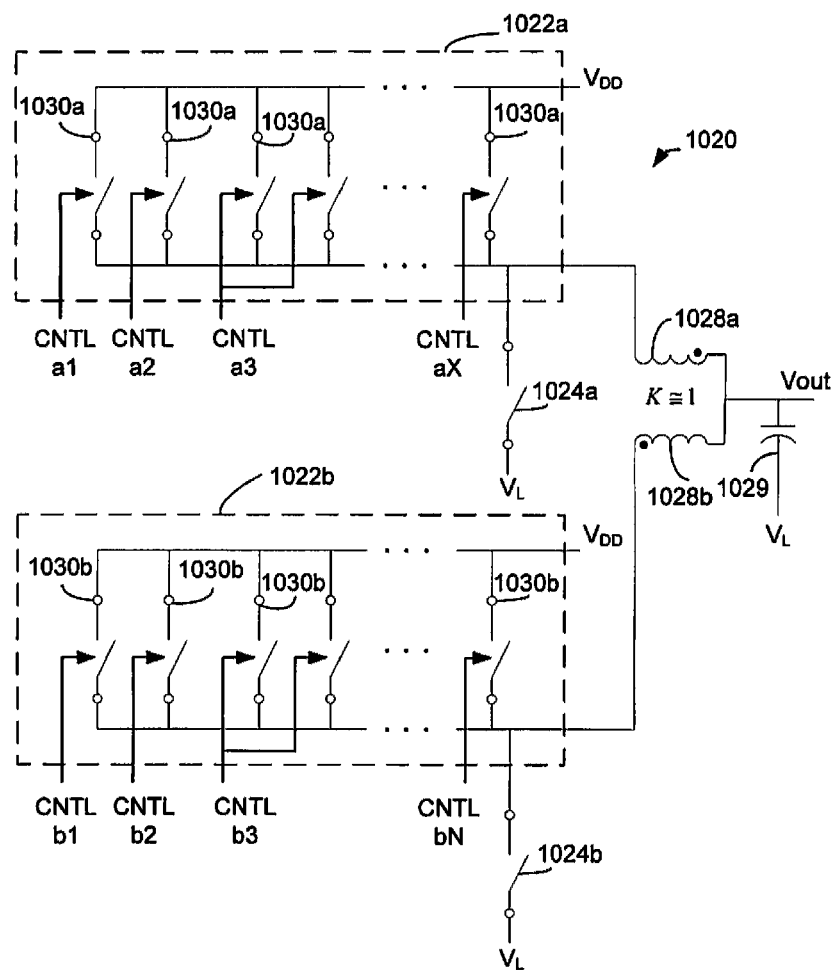
FIG. 18D is a schematic diagram of an aspect of a conduction switch array.

FIG. 18D shows an aspect of an exemplary coupled inductor regulator 1020 having a 2:1 buck configuration. The buck configuration coupled inductor regulator 1020 may include one or more conduction switch arrays 1022a and 1022b to replace the conduction switches that are described in an earlier portion of this specification. In the buck configuration, the conduction switch arrays 1022a and 1022b may receive a high-side voltage such as $V_{DD}$. Preferably each conduction switch of the coupled inductor regulator 1002 is replaced by one of the conduction switch arrays 1022, however it is within the scope to only replace a subset of the conduction switches with conduction switch arrays 1022. For example, in a 1:4 boost configuration of the coupled inductor regulator 1002, one conduction switch may be replaced with a conduction switch array, while the remaining three conduction switches are not replaced by conduction switch arrays. Control signals, CNTLxx, may independently control the switches 1030a and 1030b of each of the conduction switch arrays 1022a and 1022b. Freewheeling switches 1024a and 1024b may connect to each of the conduction switch arrays 1022a and 1022b. Each of the freewheeling switches 1024a and 1024b in the buck configuration may receive a low-side voltage such as $V_L$. Coupled inductors 1028a and 1028b may connect between the conduction switch arrays 1022a and 1022b and the output. An output capacitor 1029 may connect to the output.

Figure 18E:
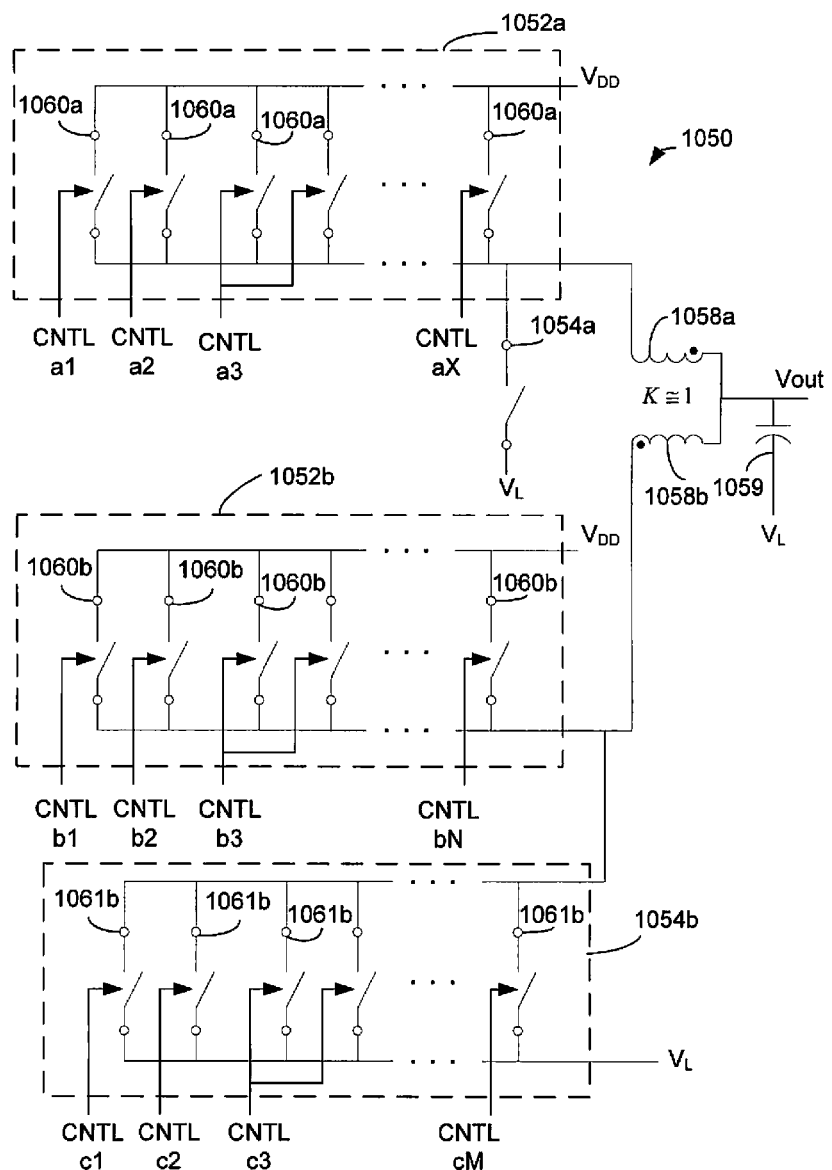
FIG. 18E is a schematic diagram of an aspect of an conduction switch array.

FIG. 18E shows another aspect of the exemplary coupled inductor regulator 1040 that may replace the coupled inductor regulator 1002. Here, a buck configuration coupled inductor regulator 1040 may include one or more conduction switch arrays 1044a and 1044b to replace the conduction switches that are described in an earlier portion of this specification. In the buck configuration, the freewheeling switch arrays 1044a and 1044b may receive a low-side voltage such as $V_L$. Preferably each freewheeling switch of the coupled inductor regulator 1002 is replaced by a freewheeling switch array 1046, however it is within the scope to only replace a subset of the freewheeling switches with the freewheeling switch array 1046. For example, in a 1:4 boost configuration of the coupled inductor regulator 1002, one freewheeling switch may be replaced with a freewheeling switch array, while the remaining freewheeling switches are not replaced by freewheeling switch arrays. Control signals, CNTLxx, may independently control the switches 1050a and 1050b of the conduction switch arrays 1044a and 104b. Conduction switches 1050a and 1050b may connect to each of the freewheeling switch arrays 1044a and 1044b. Each of the conduction switches 1042a and 1042b in the buck configuration may receive a high-side voltage such as $V_{DD}$. Coupled inductors 1048a and 1048b may connect between the freewheeling switch arrays 1044a and 1044b and the output. An output capacitor 1049 may connect to the output.

Figure 18F:
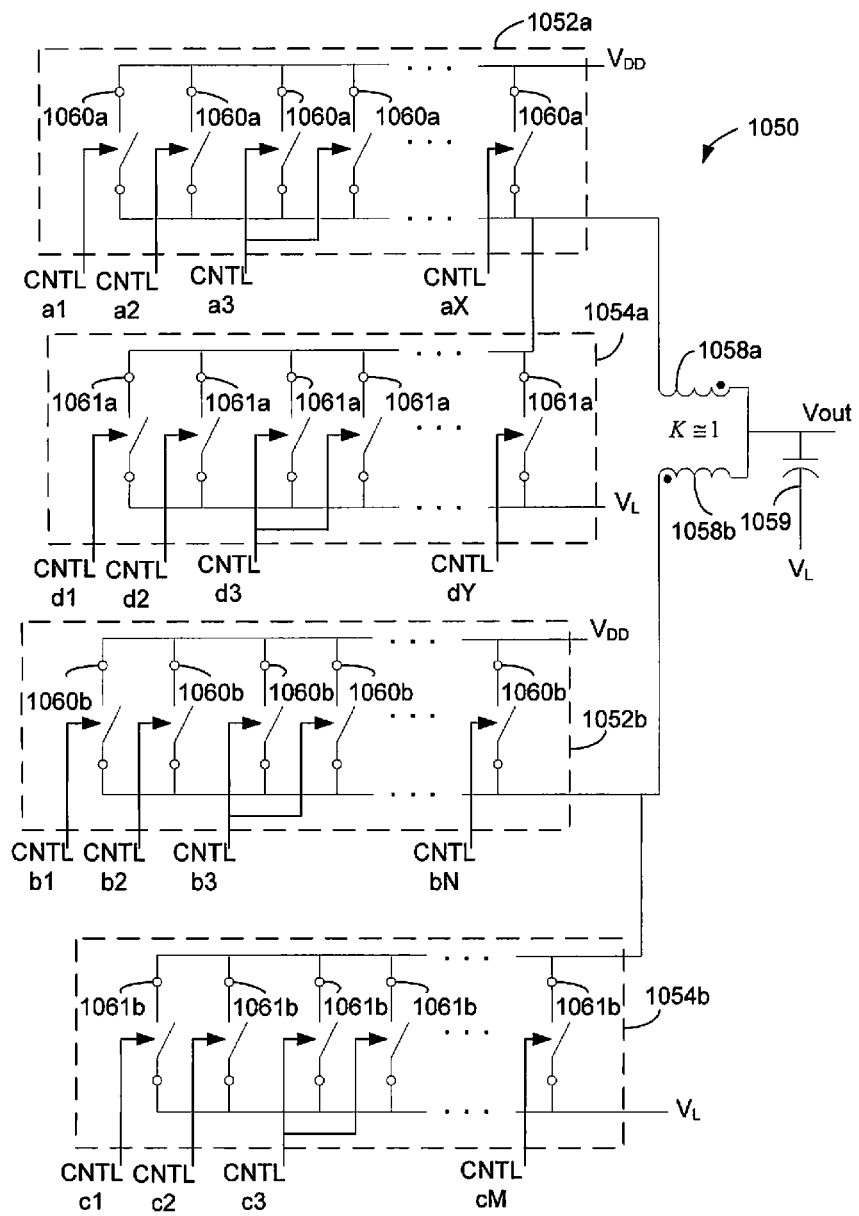
FIG. 18F is a schematic diagram of an aspect of a conduction switch array.

FIG. 18F shows another aspect of the exemplary coupled inductor regulator 1060 that may replace the coupled inductor regulator 1002. Here, a buck configuration coupled inductor regulator 1060 may include one or more conduction switch arrays 1062a and 1062b, and freewheeling switch arrays 1064a and 1064b to replace the conduction switches and freewheeling switches that are described in an earlier portion of this specification. In the buck configuration, the conduction switch arrays 1062a and 1062b may receive a high-side voltage such as $V_{DD}$, and the freewheeling switch arrays 1064a and 1064b may receive a low-side voltage such as $V_L$. Preferably each conduction switch and each freewheeling switch of the coupled inductor regulator 1002 are replaced respectively by a conduction switch arrays 1062 and a freewheeling switch arrays 1064, however it is within the scope to only replace a subset of the conduction switches and freewheeling switches with conduction switch arrays 1062 or freewheeling switch arrays 1064. For example, in a 1:4 boost configuration of the coupled inductor regulator 1002, one conduction switch may be replaced with a conduction switch array, while the remaining conduction switches and freewheeling switches are not replaced by switch arrays. Control signals, CNTLxx, may independently control the switches

1070a, 1070b, 1071a, and 1071b that comprise each of the conduction switch arrays 1062a and 1062b, and freewheeling switch arrays 1064a and 1064b. Coupled inductors 1068a and 1068b may connect between the switch arrays 1062a, 1062b, 1064a and 1064b and the output, Vout. An output capacitor 1069 may connect to the output.

Any combination of switch arrays may be used in the coupled inductor regulator 1002 so long as at least one conduction switch or freewheeling switch is replaced by a switch array. For example, the buck configuration coupled inductor regulators 1020, 1040, and 1060 shown in FIGS. 18D, 18E, and 18F merely show 3 of the 15 possible combinations of switch arrays for a 2:1 buck configuration. Further combinations are possible for the flyback and boost configurations as well as increased order configurations.

Referring to FIG. 18B, the digital controller 1004 may, as a function of the output voltage, generate the control signals to control the conduction switch array 1006. An analog-to-digital converter (ADC) 1010 may generate a digital signal that corresponds to the output voltage. Any type of ADC may be employed. A digital circuit 1012 such as a digital signal processor may process the digital signal to determine the state of the control signals for regulating the output voltage to a predetermined level. The control signals may control the quantity of conducting switches in the conduction switch array 1006 to control the voltage drop across the conduction switch array 1006 and thereby the output voltage.

In one exemplary digital LDO regulator having an input voltage of 3.3 volts, the coupled inductor regulator 1002 may be a buck configuration so that the output voltage would be approximately equal to 1.65 volts (one-half of the input voltage) if the coupled inductor regulator 1002 were operated open-loop. However, with the digital controller 1004 controlling the conduction switch array 1006, the output voltage may be regulated at voltages approximately equal to or less than 1.65 volts.

In another aspect, the digital circuit 1012 may include a burst mode 1012 for controlling the duty cycle of the switches of the conduction switch array 1006. Burst mode 1012 may advantageously provide improved regulation during operation at low output current, Iout, levels such as when Iout is so low that controlling the quantity of conducting switches is not sufficient to regulate the output voltage. The burst mode may be operated in combination with controlling the quantity of conducting switches in the conduction switch array 1006.

FIG. 19A shows an aspect of a power system 1100 for supplying a regulated supply voltage to digital logic 1102 such as a central processing unit (CPU). The power system 1100 may include a DC/DC converter 1104 followed by a digital LDO regulator 1106 to generate the regulated supply voltage. Any type of DC/DC converter 1104 may be used such as a single phase output and a multi-phase output. The fast response time of the digital LDO regulator 1106 advantageously may make the digital LDO regulator 1106 suitable for supplying power directly to the digital logic 1102.

The digital LDO regulator 1106 may include a coupled inductor regulator 1108 and digital controller 1110 as described earlier in this specification. The digital controller 1106 may include a control loop, 1112a and 1112b, to control the output voltage of the DC/DC converter 1104 so that the input voltage of the coupled inductor regulator 1108 is minimized, thereby limiting the power dissipation and increasing the maximum output current that the digital LDO regulator 1108 may supply without dropping out of regulation during a transient load change. The control loops of the digital controller 1110 may be configured so that the control loop of the coupled inductor regulator 1108 is a fast loop 1112a while the control loop of the DC/DC converter 1104 is a slow loop 1112b. Since the DC/DC converter 1104 does not require a fast response time, the DC/DC converter 1104 may advantageously be operated at a lower operating frequency leading to higher power efficiency. The conduction losses are decreased and the efficiency of the DC/DC converter 1004 is further increased since the output current of the DC/DC converter 1004 is less than one-half of the output current of a DC/DC converter used in a conventional power system. Additionally, the power system does not require voltage positioning of the output voltage. Conventional DC/DC converters that supply power to a CPU typically include voltage positioning to reduce the voltage stress applied to the CPU during transient load currents. Voltage positioning is a technique wherein the amplitude of the output voltage is programmed to vary as a function of the amplitude of the output current.

Figure 19B:
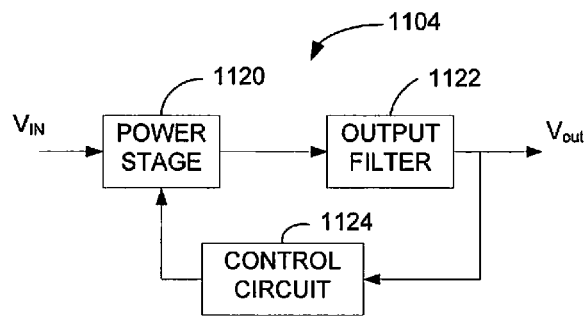
FIG. 19B is a block diagram of an aspect of a conventional DC/DC converter for generating an output voltage.

FIG. 19B shows a block diagram of an aspect of the DC/DC converter 1104. A power stage 1120 may generate a chopped output from an input voltage, Vin. An output filter 1122 may filter the chopped output to generate a DC output, Vout. A control circuit 1124 may control the power stage as a function of the DC output.

FIG. 20A shows voltage positioning of an output voltage. A first waveform 1150 shows an output voltage of a conventional converter that is programmed to have a negative slope with increasing output current. A second waveform 1152 shows an aspect of a digital LDO regulator wherein the output voltage has a flat slope for all values of output current. A third waveform 1154 shows another aspect of a digital LDO regulator wherein the output voltage has a positive slope with increasing output current.

FIG. 20B shows waveforms of the output voltage, Vout, 1160 and output current, Iout, 1162 of a conventional DC/DC converter that does not include voltage positioning. The output voltage may fluctuate during transients in the output current due to the relatively slow response of the conventional DC/DC converter. The fluctuation of Vout during the high-to-low transition of the output current may be especially problematic due to possible voltage overstress of the CPU.

FIG. 20C shows waveforms of the output voltage, Vout, 1170 and output current, Iout, 1172 of a conventional DC/DC converter that includes voltage positioning. The amplitude of the output voltage at high output currents may be programmed to be lower than the amplitude of the output voltage at low output currents. At high output current amplitudes, the amplitude of the output voltage is programmed to be less than the steady state value without voltage programming. During a high-to-low output current transient, the maximum overshoot of the output voltage is reduced since the overshoot begins from a lower steady-state output voltage amplitude. The lower maximum overshoot reduces the voltage stress on the digital circuit that receives power. However, voltage positioning may have a disadvantage at lower output current levels, wherein the higher output voltage level may lead to an increase in leakage current in the digital circuit. As CMOS device geometry is scaled below 0.13 u a slight increase in supply voltage may cause an exponential increase in leakage current in the digital circuit. Yet, voltage positioning results in a higher supply voltage when the digital chip operates at lower speeds (low supply current), leading to high leakage when the digital circuit is supposed to be relatively inactive. In addition, since voltage positioning causes the lowest supply voltage level to be applied to the digital circuit when the supply current is highest, the maximum clock frequency of the digital circuit may be limited.

FIG. 20D shows waveforms of the output voltage, Vout, 1180 and output current, Iout, 1182 of an aspect of a digital LDO regulator. The fast response time of the LDO regulator negates the need for voltage positioning, since voltage transients during load current changes are negligible. Since the output voltage to the digital circuit during high supply current operation may be controlled to be higher than under voltage positioning, the digital circuit may operate at a higher maximum clock frequency.

Figure 21A:
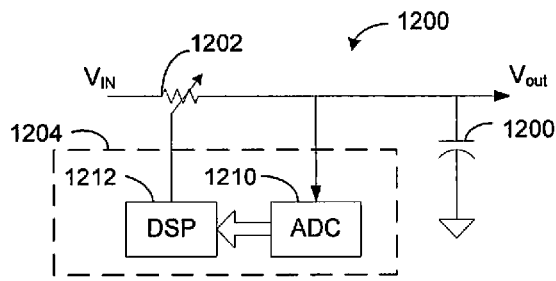
FIG. 21A is a block diagram of an aspect of an LDO regulator.

FIG. 21A shows an aspect of a digital LDO regulator 1200 configured as a digital resistor for generating a regulated output voltage, Vout, from an input voltage, Vin. The digital LDO regulator 1200 is similar in function to digital LDO regulator 1000 with corresponding elements numbered in the range 1200-1208, except that digital LDO regulator 1200 includes a switch array 1202 instead of a coupled inductor regulator for regulating the output voltage. The digital resistor configured LDO regulator 1200 may regulate the output voltage to any level that is less than the input voltage. A digital controller 1204 operates in a similar manner to the digital controller 1004 of the digital LDO regulator 1000 to control the switch array 1202. An output capacitor 1220 may filter the output voltage to provide energy storage and noise suppression.

Figure 21B:
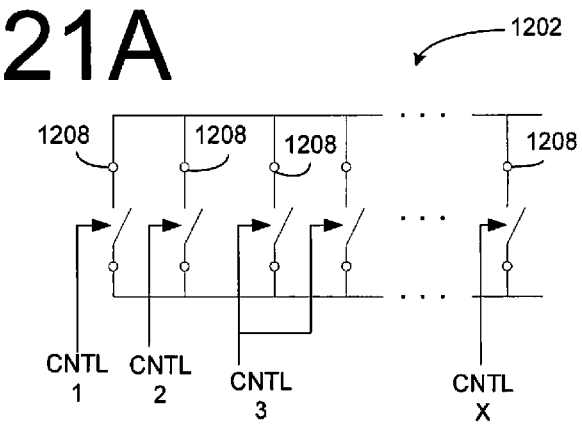
FIG. 21B is a schematic diagram of an aspect of a switch array.

FIG. 21B shows an aspect of the switch array 1202 for the digital LDO regulator 1200. Any type of switches may be used for the switch array 1202 such as MOSFETs, NMOS, PMOS, and BJTs although an array of MOSFETs on a single integrated circuit is preferable. By controlling the quantity of switches that conduct energy during a conduction cycle the power losses in the switch array 1202 may be controlled. For example, if the switch array 1202 is implemented as an array of MOSFETs, the voltage drop across the switch array 1202 may be controlled as a function of the quantity of MOSFETs that conduct energy during a cycle. Control signals, CNTL1-CNTLX, may independently control the switches 1208 on a cycle-by-cycle basis. The switches 1208 may be controlled in groups and individually.

Figure 22:
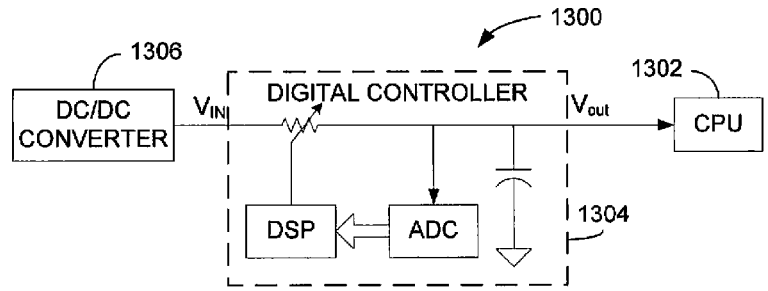
FIG. 22 is a block diagram of an aspect of a power system including an LDO regulator for supplying power to digital logic.

FIG. 22 shows an aspect of a power system 1300 for supplying power to a CPU 1302. The power system 1300 may include a digital LDO regulator 1304 configured as a digital resistor type. The digital LDO regulator 1304 may generate a regulated output voltage, Vout, from an input voltage, Vin. A DC/DC converter 1306 may generate the input voltage for the digital LDO regulator 1304. The input voltage is preferably The digital LDO regulator 1304 is similar in function to digital LDO regulator 1200.

Figure 23:
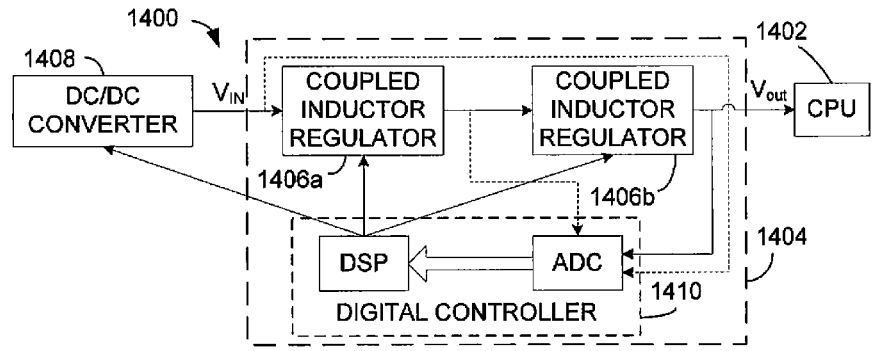
FIG. 23 is a block diagram of an aspect of a power system including an LDO regulator for supplying power to digital logic.

FIG. 23 shows an aspect of a power system 1400 for supplying power to a CPU 1402. The power system 1400 may include a digital LDO regulator 1404 configured as a coupled inductor type for regulating the power to the CPU 1402. The digital LDO regulator 1404 may include two or more coupled inductor regulators 1406a and 1406b in series to generate an output voltage, Vout, from an input voltage, Vin. A DC/DC converter 1408 may generate the input voltage for the digital LDO regulator 1404. The digital LDO regulator 1404 may include a digital controller 1410 to control the coupled inductor regulators 1406a and 1406b, and the DC/DC converter 1408. The digital controller 1410 may function in a similar manner to digital controller 1004 of LDO regulator 1000 with the additional function of controlling the output voltage of the DC/DC converter 1408. The digital controller 1410 may control the output voltage of the DC/DC converter 1408 either directly via a feedback signal from the output of the DC/DC converter 1408 or indirectly via other circuit characteristics such the current flowing to the CPU and the output voltages of the coupled inductor regulators.

Figure 24:
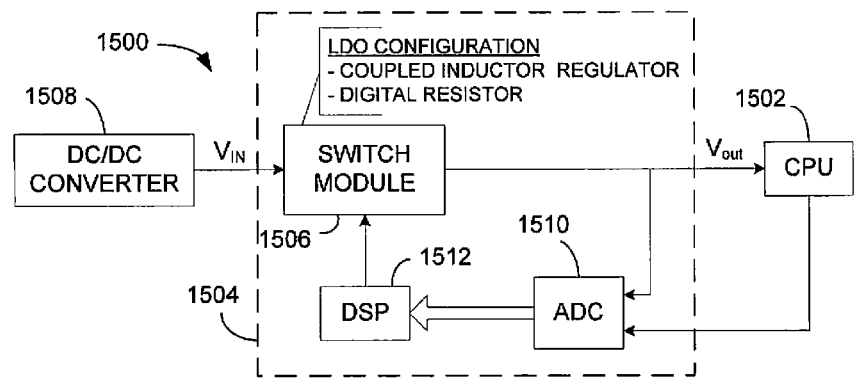
FIG. 24 is a block diagram of an aspect of a power system including an LDO regulator for supplying power to digital logic.

FIG. 24 shows an aspect of a power system 1500 for supplying power to a CPU 1502. The power system 1500 may include a digital LDO regulator 1504 for generating a regulated output voltage, Vout, from an input voltage, Vin. A DC/DC converter 1508 may generate the input voltage for the digital LDO regulator 1504. The digital LDO regulator 1504 may include a switch module 1506 that is configured for operation as either a coupled inductor type or a digital resistor type. For coupled inductor operation the switch module is a coupled inductor regulator similar in function to the coupled inductor regulator 1006. For digital resistor operation the switch module 1506 is a switch array similar in function to switch array 1202. The digital LDO regulator 1504 may include an ADC 1510 and a DSP 1512 to control the switch module 1506 as a function of the output voltage and external stimuli such as CPU control signals and other circuit signals. The CPU control signals may include wake mode, burst mode, and sleep mode as well as any other CPU control signals.

FIG. 25A shows an aspect of a multi-chip module 1600. The multi-chip module 1600 may include digital logic 1602 to provide any type of function. The digital logic 1602 may be any type of logic such as complex logic and processors such as a Power PC and X86 chips. A digital LDO regulator 1604 in accordance with the teachings of this specification may receive an input voltage and generate a regulated output voltage therefrom to power the digital logic 1602.

FIG. 25B shows a two-dimensional side view of an aspect of the multi-chip module 1600. Any type of physical configuration may be used for the multi-chip module 1600. A heatsink 1606 may provide a thermal path for heat generated by the digital logic 1602 and the LDO regulator 1604. A package substrate 1612 may interconnect the digital logic 1602 to the digital LDO regulator 1604. One or more pins 1608 may connect to the package substrate 1612 to provide an interconnect from the multi-chip module 1600 to another assembly such as a motherboard. For a coupled inductor configuration of the LDO regulator 1604, one or more coupled inductors 1610 associated with the digital LDO regulator 1604 may be mounted on the package substrate 1612.

FIG. 26A shows an aspect of a semiconductor device 1700 fabricated on a single semiconductor die 1701. The semiconductor device including a digital LDO regulator 1702 and a digital circuit 1704. The semiconductor device 1700 may include digital logic 1702 to provide any type of function. The digital logic 1702 may be any type of logic such as complex logic and processors such as a Power PC and X86 chips. A digital LDO regulator 1704 in accordance with the teachings of this specification may receive an input voltage and generate a regulated output voltage therefrom to power the digital logic 1702

FIG. 26B shows a two-dimensional side view of an aspect of the semiconductor device 1700. A heatsink 1706 may provide a thermal path to dissipate heat generated on the single semiconductor die 1701. An interconnect assembly 1712 may interconnect the semiconductor die 1700 to other devices. Any type of interconnect assembly 1712 may be used such as a motherboard. One or more pins 1708 may connect to the interconnect assembly 1712. For a coupled inductor configuration of the LDO regulator 1704, one or more coupled inductors 1710 associated with the LDO regulator 1704 may be mounted on the interconnect assembly 1712.

A number of embodiments of the invention have been described. Nevertheless, it will be understood that various modifications may be made without departing from the spirit and scope of the invention. Accordingly, other embodiments are within the scope of the following claims.

What is claimed is:

1. A circuit comprising:
at least one regulator comprising
a first inductor having an input and an output;
a second inductor having an input and an output, wherein the output of the second inductor is connected to the output of the first inductor;
a first array of switches (i) connected to the input of the first inductor, (ii) connected in series with the first inductor, (iii) configured to receive an input voltage from an input voltage source, and (iv) comprising a first switch and a second switch, wherein the first switch is connected in parallel with the second switch; and
a second array of switches (i) connected to the input of the second inductor, (ii) connected in series with the second inductor, (iii) configured to receive the input voltage, and (iv) comprising a third switch and a fourth switch, wherein the third switch is connected in parallel with the fourth switch,
wherein an output voltage of the at least one regulator is provided at (i) the output of the first inductor, and (ii) the output of the second inductor; and
a controller configured to (i) detect the output voltage, and (ii) regulate the output voltage by generating control signals based on the output voltage, wherein states of the first array of switches and states of the second array of switches are controlled by respective ones of the control signals.

2. The circuit of claim 1, further comprising an analog-to-digital converter configured to (i) receive the output voltage, and (ii) convert the output voltage from a digital signal to an analog signal,
wherein the controller generates the control signals based on the analog signal.

3. The circuit of claim 2, further comprising a capacitance connected between (i) a reference voltage source, and (ii) the output of the first inductor and the output of the second inductor.

4. The circuit of claim 1, wherein:
the first array of switches is connected in parallel between the input voltage source and a reference voltage source; and
the second array of switches is connected in parallel between the input voltage source and the reference voltage source.

5. The circuit of claim 4, wherein:
the first array of switches is connected between the input of the first inductor and the reference voltage source; and
the second array of switches is connected between the input voltage source and the input of the second inductor.

6. The circuit of claim 4, wherein:
the first array of switches includes inputs and outputs, wherein the inputs of the first array of switches are connected to the input voltage source, and wherein the outputs of the first array of switches are connected to (i) the input of the first inductor, and (ii) the reference voltage source; and
the second array of switches includes inputs and outputs, wherein the inputs of the second array of switches are connected to the input voltage source, and wherein the outputs of the second array of switches are connected to (i) the input of the second inductor, and (ii) the reference voltage source.

7. A circuit comprising:
at least one regulator comprising
a first inductor having an input and an output,
a second inductor having an input and an output, wherein the output of the second inductor is connected to the output of the first inductor,
a first array of switches (i) connected to the input of the first inductor, (ii) connected in series with the first inductor, (iii) configured to receive an input voltage from an input voltage source, and (iv) connected in parallel between the input voltage source and a reference voltage source,
wherein the first array of switches includes inputs and outputs, wherein the inputs of the first array of switches are connected to (i) the input voltage source, and (ii) the input of the first inductor, and wherein the outputs of the first array of switches are connected to the reference voltage source; and
a second array of switches (i) connected to the input of the second inductor, (ii) connected in series with the second inductor, (iii) connected in parallel between the input voltage source and the reference voltage source, and (iv) configured to receive the input voltage,
wherein the second array of switches includes inputs and outputs, wherein the inputs of the second array of switches are connected to (i) the input voltage, and (ii) the input of the second inductor, and wherein the outputs of the second array of switches are connected to the reference voltage source,
wherein an output voltage of the at least one regulator is provided at (i) the output of the first inductor, and (ii) the output of the second inductor; and
a controller configured to (i) detect the output voltage, and (ii) regulate the output voltage by generating control signals based on the output voltage, wherein states of the first array of switches and states of the second array of switches are controlled by respective ones of the control signals.

8. The circuit of claim 7, further comprising:
a first switch connected between the input voltage source and the first array of switches; and
a second switch connected between the input voltage source and the second array of switches.

9. The circuit of claim 7, wherein the at least one regulator further comprises:
a third array of switches comprising a plurality of switches connected in parallel between the first inductor and the reference voltage source; and
a fourth array of switches comprising a plurality of switches connected in parallel between the second inductor and the reference voltage source,
wherein states of the third plurality of switches and states of the fourth plurality of switches are controlled by respective ones of the control signals.

10. A circuit comprising:
at least one regulator comprising
a first inductor having an input and an output,
a second inductor having an input and an output, wherein the output of the second inductor is connected to the output of the first inductor,
a first array of switches (i) connected to the input of the first inductor, (ii) connected in series with the first inductor, and (iii) configured to receive an input voltage from an input voltage source, and a second array of switches (i) connected to the input of the second inductor, (ii) connected in series with the second inductor, and (iii) configured to receive the input voltage, wherein an output voltage of the at least one regulator is provided at (i) the output of the first inductor, and (ii) the output of the second inductor;

a controller configured to (i) detect the output voltage, and (ii) regulate the output voltage by generating control signals based on the output voltage, wherein states of the first array of switches and states of the second array of switches are controlled by respective ones of the control signals; and a direct current-to-direct current converter configured to (i) generate the input voltage, and (ii) adjust the input voltage based on a control signal received from the controller.

11. The circuit of claim 10, wherein the controller is configured to (i) detect the input voltage, and (ii) control the direct current-to-direct current converter to adjust the input voltage based on the input voltage.

12. The circuit of claim 10, further comprising:
a first loop comprising the direct current-to-direct current converter; and
a second loop comprising the at least one regulator, wherein the second loop is faster than the first loop.

13. The circuit of claim 12, wherein the first loop controls output of the direct current-to-direct current converter to (i) minimize the input voltage, and (ii) maximize current output of the at least one regulator.

14. The circuit of claim 10, wherein the at least one regulator comprises:
a first coupled inductor regulator configured to receive the input voltage; and
a second coupled inductor regulator configured to (i) receive an output of the first coupled inductor regulator, and (ii) generate the output voltage.

15. The circuit of claim 14, further comprising an analog-to-digital converter configured to convert the output voltage to an analog signal, wherein:
the controller generates the control signals based on the analog signal; and
the direct current-to-direct current converter, the first coupled inductor regulator and the second coupled inductor regulator operate based on the control signals.

16. The circuit of claim 15, wherein the analog-to-digital converter is configured to (i) receive the output of the first coupled inductor regulator, and (ii) convert the output voltage to the analog signal based on the output of the first coupled inductor regulator.

17. The circuit of claim 15, wherein the analog-to-digital converter is configured to (i) receive the input voltage, and (ii) convert the output voltage to the analog signal based on the input voltage.

18. The circuit of claim 1, further comprising a low dropout regulator comprising the at least one regulator and the controller, wherein the at least one regulator comprises a coupled inductor regulator.

19. The circuit of claim 1, wherein:
the output voltage is provided to a processor; and
the circuit further comprises an analog-to-digital converter configured to convert the output voltage to an analog voltage based on a control signal from the processor,
wherein the control signal from the processor indicates an operating mode.

20. The circuit of claim 10, further comprising a processor configured to receive the output voltage of the at least one regulator,
wherein the controller is configured to generate the control signal received by the direct current-to-direct current converter based on (i) the input voltage generated by the direct current-to-direct current converter, and (ii) the output voltage of the at least one regulator.

21. The circuit of claim 14, further comprising:
a direct current-to-direct current converter configured to (i) receive a control signal from the controller, and (ii) generate the input voltage received by the first coupled inductor regulator based on the control signal received from the controller; and
a processor configured to receive the output voltage of the second coupled inductor regulator,
wherein the controller is configured to, based the output voltage of the second coupled inductor regulator, generate the control signal received by the direct current-to-direct current converter.

* * * * *